United States Patent [19]
Streit

[11] 3,782,007
[45] Jan. 1, 1974

[54] LESSON SELECTOR ELEMENT CONTROLLED DEVICE FOR PRESENTING VISUAL AND AUDIO LESSONS AND RECEIVING RECORDED ANSWERS ON A SOUND TRACK

[76] Inventor: James L. Streit, Rt. 3, Box 364, Vernon, Tex. 76384

[22] Filed: July 17, 1972

[21] Appl. No.: 272,641

[52] U.S. Cl. .................................. 35/8 A, 353/15
[51] Int. Cl. ..................... G09b 5/06, G03b 31/06
[58] Field of Search .......................... 35/8 A, 35 C; 40/28.3; 353/15, 19

[56] References Cited
UNITED STATES PATENTS
| | | | |
|---|---|---|---|
| 3,556,654 | 1/1971 | Stapleton | 35/8 A UX |
| 3,481,052 | 12/1969 | Dorsett | 35/8 A |
| 3,594,919 | 7/1971 | DeBell et al. | 35/8 A |

Primary Examiner—Wm. H. Grieb
Attorney—Wayland D. Keith

[57] ABSTRACT

A device for teaching a multiplicity of students the same subject matter or different subject matter on each of a plurality of machines, by presenting these in visual and audio form, asking pertinent test questions and receiving the answers on a sound track, such as a removable cassette tape, to enable the teacher to evaluate the progress of the student in the subjects being studied. A lesson selector element is utilized for each lesson to be taught. The lesson selector element automatically sets or resets the machine to the particular lesson to be taught. The lesson selector element thus teaches the lesson for a predetermined number of minutes, when the visual and audio portions are cut off, at which time a signal is given the student to answer or to recite answers to questions relative to the particular material taught, and to automatically stop and reject the lesson selector element, after the recorded material has been properly identified on the sound strip by indicia. The teacher may thus evaluate the answers in accordance with the subject matter exposed to the student.

14 Claims, 32 Drawing Figures

PATENTED JAN 1 1974
3,782,007
SHEET 05 OF 11
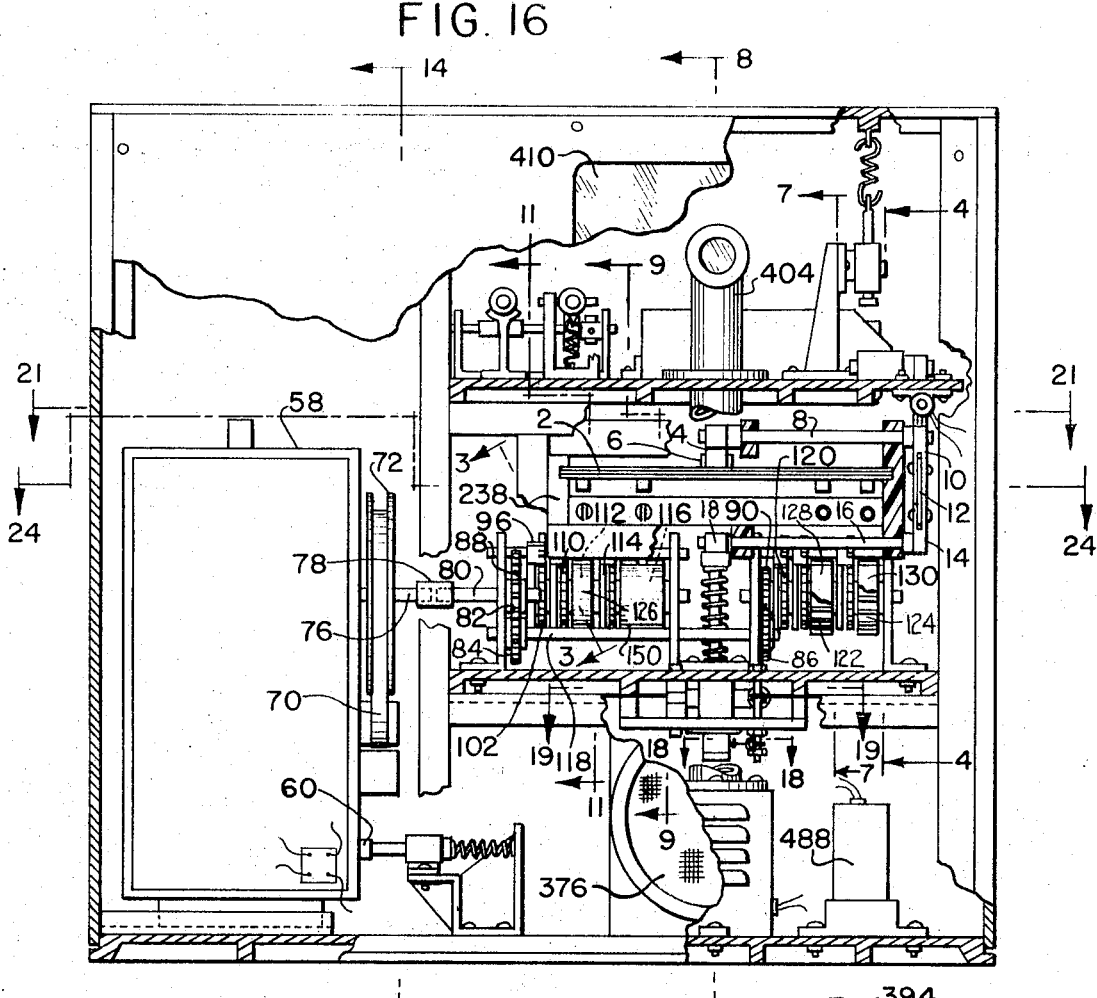
FIG. 16
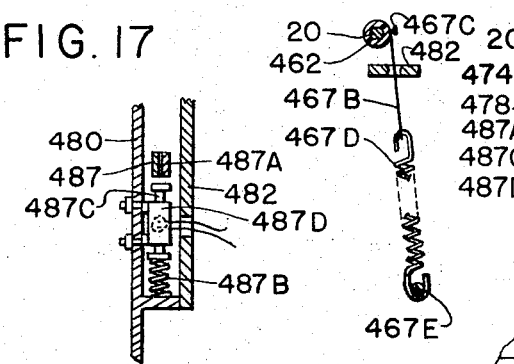
FIG. 18
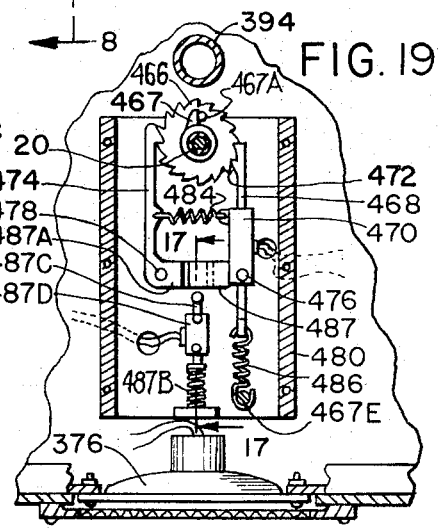
FIG. 19
FIG. 17
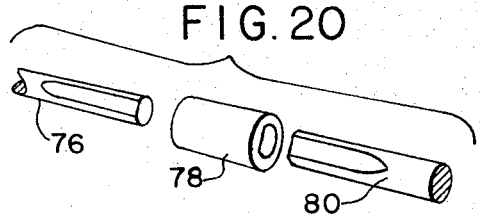
FIG. 20

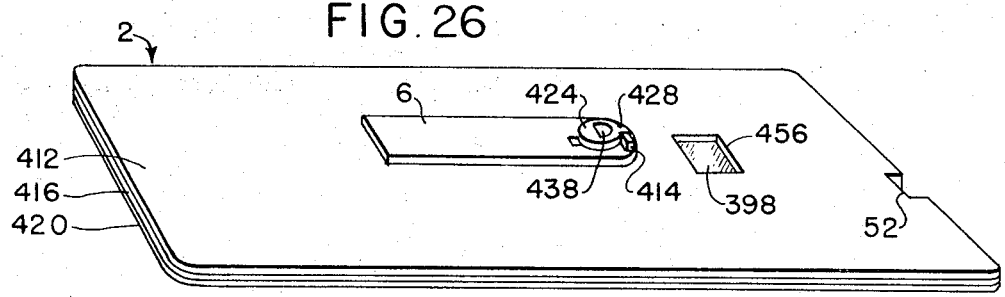
FIG. 26
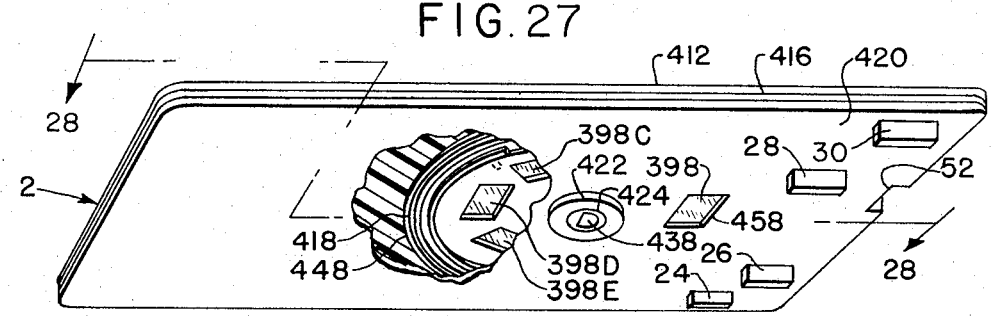
FIG. 27
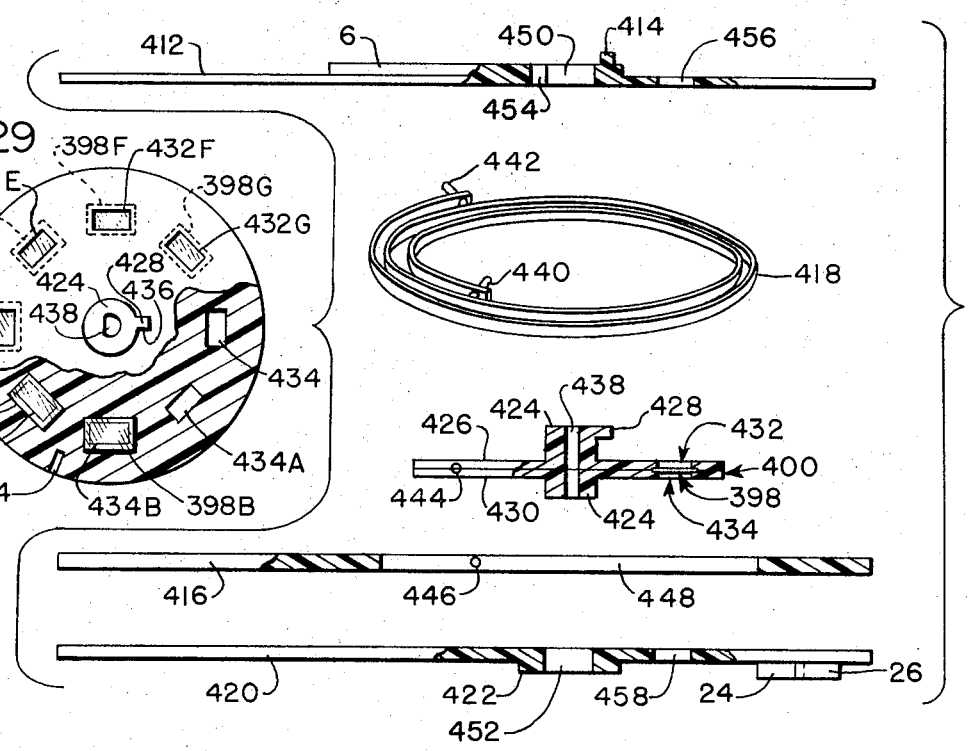
FIG. 28
FIG. 29

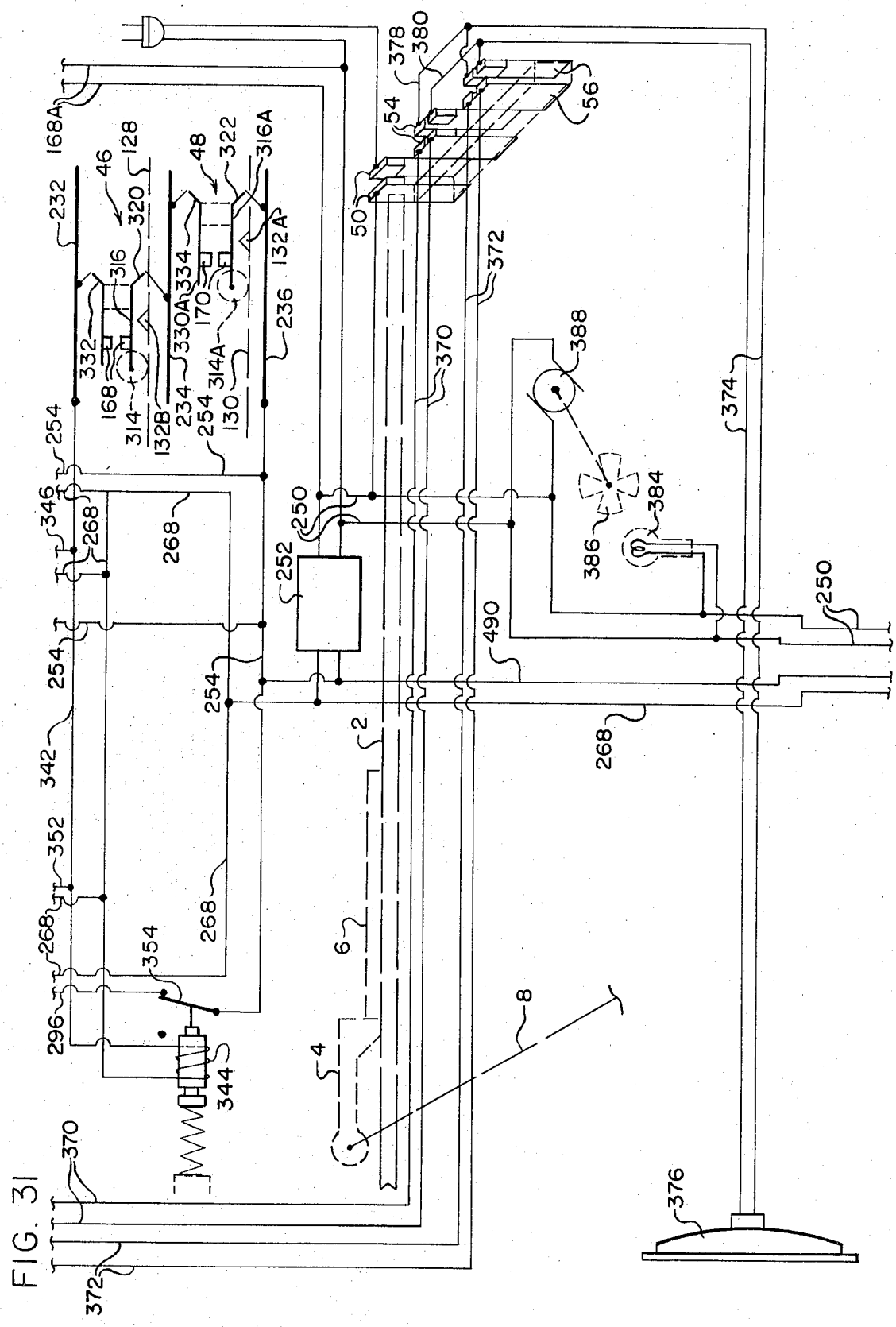

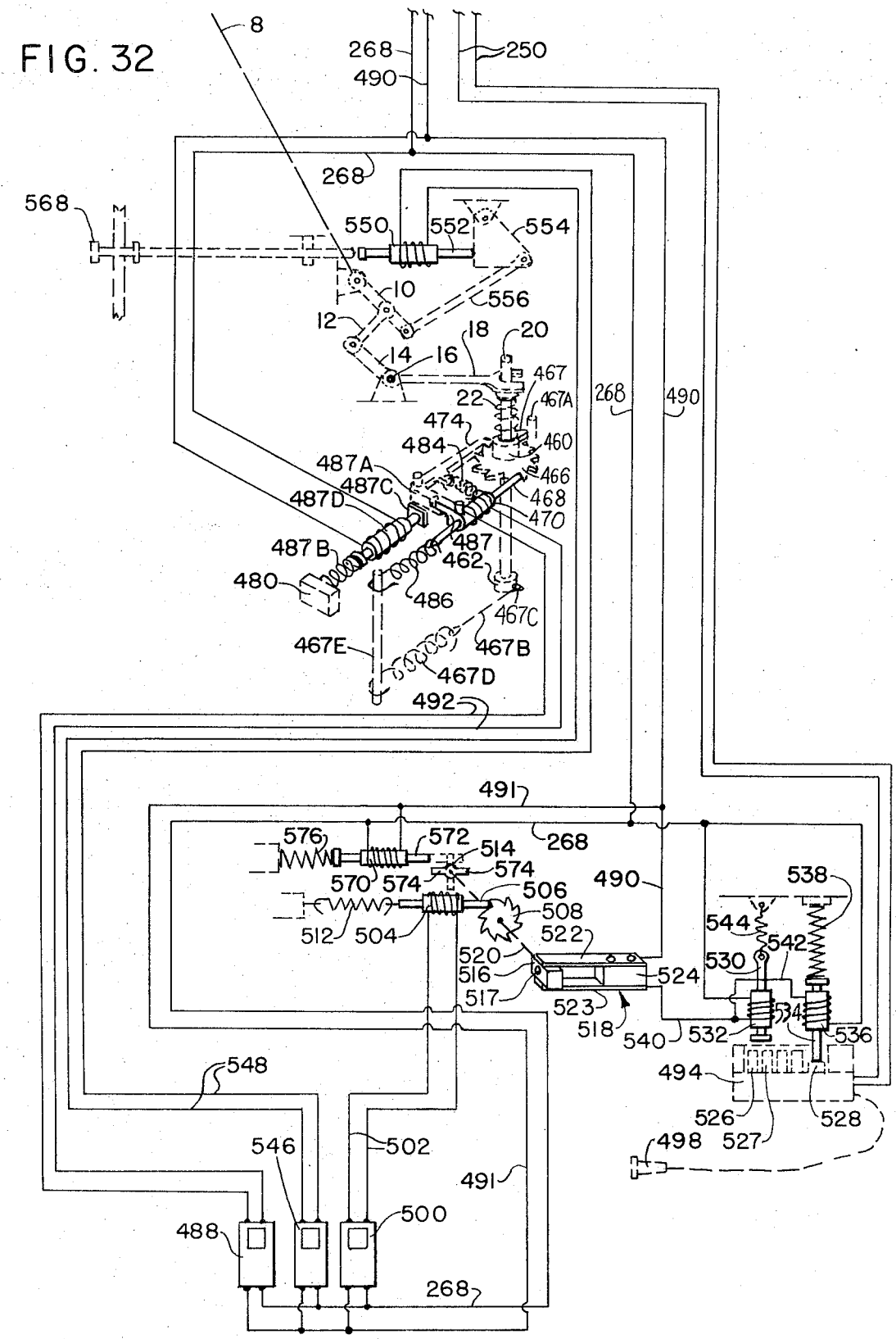

LESSON SELECTOR ELEMENT CONTROLLED DEVICE FOR PRESENTING VISUAL AND AUDIO LESSONS AND RECEIVING RECORDED ANSWERS ON A SOUND TRACK

BACKGROUND OF THE INVENTION

The present invention relates generally to teaching machines, and more particularly to a teaching machine wherein the subject matter is presented visually and audibly from a preprogrammed projection film and from a sound track which is activated by inserting a programming lesson selector element. The lesson selector element is automatically indexed to bring a lesson into register, and the answers, when given, are recorded on a sound track, and in some instances in combination with graphic sheets.

1. Prior Art

The prior art discloses many types of teaching machines, which, for the most part, are not capable of programming a mutliplicity of lessons in the same machine to give independent visual and audio teaching on each subject for a predetermined length of time and permit the answers to be given, either wholly through audio recording or a combination of audio recording and graphic answers. In general, known machines are complex, expensive in construction and not readily subject to be reprogrammed for each student, without extensive replacement of the data systems.

2. Summary of the Invention

The present teaching machine contemplates the presentation of information by visual film and by sound producing means. The lessons are automatically brought into register when a lesson selector element or information retriever is placed in the machine, which will cause the retrieval of one of a multiplicity of lessons, which could be on the order of one to two hundred or more, without changing the master sound track on the machine. The master sound track may be readily changed and indexed with the machine so it will come into proper register when the lesson selector element or lesson retriever is put into the machine, with the lesson selector element providing a portion of the lesson for visual analysis, while the sound provides the balance of the lesson.

When the lesson is taught in accordance with the program lesson selector element or lesson initiator, which has been inserted into the machine, a time signal is given to enable the student to prepare to take a quiz. The quiz may be one question followed by an answer, several questions followed by the several answers, or a series of questions, each followed by an answer. The answers are recorded on a sound receiving instrumentality, such as a tape cassette recorder, a magnetic wire recorder, which may be in cartridge form, or a phonographic disc or cylinder. Each of the recordings is properly identified by number or other indicia to enable the teacher to properly grade the material submitted.

The present invention also contemplates, but is not restricted to, the use of graphic sheets in combination with the lesson, whereby the student may draw or symbolize such questions as cannot be answered phonetically, such as finger position on a musical instrument. The control of the machine is preprogrammed on the lesson selector element or lesson initiator in such manner that, when certain functions are performed, the teaching machine will move into another phase. Other phases may be initiated, for example, by an audio switch or whistle switch. However, the present device is not limited to such switches, but the use thereof is pointed up, since a sound track being played can program the proper sequence of operation of the machine.

An object of this invention is to provide a teaching machine which is all inclusive, to teach a subject both visually and audibly and to receive and record the answers to the preprogrammed subject matter with the use of such indicia that the answers may be readily cross checked with the questions in a minimum of time.

Another object of the invention is to provide a device which will automatically index that portion of a lesson which is to be taught by audio reproduction in complementary relation to a lesson selector initiator which contains that portion of the lesson which is to be projected for visual use.

A further object of the invention is to provide a teaching machine which will teach for a predetermined period of time, at the end of which period a signal will be communicated to the student, to alert the student to the beginning of an answer period, and to the fact that the answers will be recorded for a predetermined length of time, thereby recording the answers on readily accessible sound media, such as a cassette cartridge.

Still another object of the invention is to provide a teaching machine which lends itself to teaching of various subjects by both visual and audio means, such as band, modeling, poise, mechanics, and other arts and crafts which have heretofore required personal instruction in order to be properly presented.

Yet a further object of the invention is to provide an electrically operated teaching machine which is self-contained and which does not require the use of remotely positioned screens or speakers.

Yet another object of the invention is to provide a lesson initiator module which has initiating elements to actuate certain switches and certain mechanical elements to bring the proper lesson into register, both on the lesson initiator and in the teaching machine.

Still another object of the invention is to provide a lesson initiator which has a projectable film therein, which will automatically change to display a picture relative to the subject matter being taught and to provide means for synchronously producing sounds that are compatible with the picture displayed, Another object of the invention is to provide a lesson recording sound means which is synchronized and indexed with respect to the lesson being taught.

Still another object of the invention is to provide a lesson selector element controlled device which provides visual and audible representations in synchronization and with effeciency, effectiveness and reliability.

Yet another object of the invention is to provide a lesson selector controlled device which may be utilized with facility and convenience by anyone to provide visual and audible representations in snychronism.

BRIEF DESCRIPTION OF THE DRAWINGS

With these objects in mind and others which will become apparent as the description proceeds, reference is to be had to the accompanying drawings, in which like reference characters designate like parts in the several views thereof, in which:

FIG. 16 is a front elevational view of the teaching machine, with parts broken away, and with parts being shown in section to bring out the details of construction;

FIG. 17 is a view, partly in section, of the solenoid arrangement, taken on the line 17 — 17 of FIG. 19, looking in the direction indicated by the arrows;

FIG. 18 is a view, partly in section, showing the tension spring of the detent arrangement of FIG. 19;

FIG. 19 is a view, partly in section, of the detent arrangement of the teaching machine, taken on the line 19—19 of FIG. 16, looking in the direction indicated by the arrows;

FIG. 20 is a fragmentary exploded perspective view of the drive shaft arrangement as shown in FIGS. 3 and 16;

FIG. 26 is a top perspective view of the lesson selector element, which has a portion of the lesson thereon;

FIG. 27 is a bottom perspective view of the lesson selector element, as shown in FIG. 26, with portions being broken away and shown in section, to bring out the details of construction;

FIG. 28 is an exploded view, partly in section and partly in perspective, of the lesson selector element, as shown in FIGS. 26 and 27; taken on the line 28 — 28 of FIG. 27, looking in the direction indicated by the arrows;

FIG. 29 is an enlarged top plan view, with parts broken away and with parts shown in section, of the photographie slide arrangement of the lesson selector of the teaching machine;

FIGS. 30, 31 and 32, when arranged in sequential relation, constitute a diagram of the electrical circuit of the teaching machine.

DETAILED DESCRIPTION OF THE INVENTION

Figure 1:
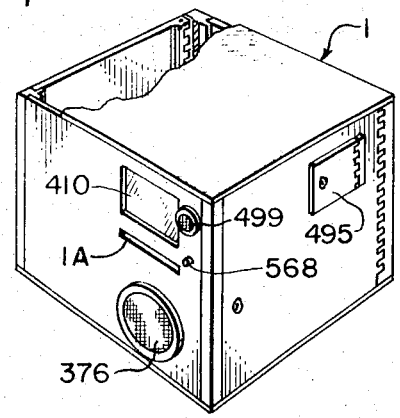
FIG. 1 is a perspective view, with parts broken away, of an embodiment of the lesson selector element or preprogrammed, controlled teaching machine.

The lesson selector element of the preprogrammed teaching machine provides a means of presenting any one of a plurality of lessons, without the necessity of a teacher being present. Each of the lessons is coordinated with respect to sight and sound, as hereinbefore described, means is also provided to record the reactions of the students to certain parts of the lesson and to record the student's answers to any question which the instructor may deem necessary. The instructor is thereby provided with a basis for assessing a grade to the student's lesson.

The outward appearance of the teaching machine somewhat resembles a television set. A suitable cabinet is provided to house the operating elements of the machine, and a screen is provided in the front of the cabinet. The visual portion of the lesson is projected onto the acreen. A suitable speaker is also located directly behind a grid or cover in front of the cabinet. The sound or audio portion of the lesson is emitted through the speaker. An additional opening is provided in the front of the cabinet, which opening is provided with a suitable cover or grid, the sound of the student's response passes through the opening and is picked up by a microphone which is located directly behind the opening. The microphone is connected to a cassette recorder placed inside the cabinet. A slot is provided in the front of the cabinet for the purpose of receiving a laminated plastic lesson selector element. The purpose of the lesson selector element is hereinafter described. A lesson reject push button is also provided in the front of the cabinet, as will be more fully described hereinafter.

Suitable hinged access doors are provided on each side of the cabinet, for maintenance of the operating elements of the teaching machine, and an additional, smaller door is provided in the left hand access door, to provide access to the cassette recorder. The teaching machine is rendered tamper-proof by the provision of flush-type locks on all the access doors.

The operating elements of the teaching machine are housed in the above mentioned cabinet. The operating elements consist essentially of a standard commercial stereo tape recorder with push button controls, two banks of counter mechanisms, a set of four flexible belts which are driven by the counter mechanisms, a set of four slidably mounted carriages positioned directly above the flexible belts, a system of relays and solenoids for operating the push buttons on the tape recorder, a speaker, mentioned above, a "Magic Lantern" type of photographis slide projector with a suitable system of lenses and reflectors for projecting an image on a screen of the above mentioned type, a cassette recorder, above mentioned, a second system of relays and solenoids for operation of the push button on the cassette recorder, an electromechanical mechanism for selecting a photographic image to be projected on the screen in a manner that will be described more in detail hereinafter, a second electromechanical mechanism for locking in a laminated plastic lesson selector element and for ejecting the lesson selector element at the completion of the lesson, and the necessary wiring for the aforementioned elements. A set of three "whistle switches" are also included for a purpose, as will be more fully set out hereinafter. A whistle switch is a relay which is sensitive to an ultrasonic signal.

An essential part of the present device is a set of laminated plastic lesson selector elements, there being a separate element for each lesson. Each of the lesson selector elements contains a rotatable disc equipped with a series of photographic transparencies for use with the slide projector in the machine. The lesson selector elements are also provided with a series of projections which engage corresponding projections on the carriages, for the purpose of positioning the carriages which, in conjunction with the system or relays, solenoids, etc., operate the push buttons on the tape recorder in such manner that the desired lesson stored in the tape of the tape recorder is selected and played. During the course of the lesson, a series of ultrasonic signals of three different frequencies is superimposed on the contents of the program of each lesson.

Each of the whistle switches is tuned to one of these frequencies and ignores the other two. One of the whistle switches is connected to the mechanism which rotates the disc containing the photographic transparencies. The second whistle switch is connected to the mechanism which turns the cassette recorder on and off. The third whistle switch is connected to the solenoid which operates the linkage to release the lesson selector element at the end of the lesson. In addition to the solenoid-operated linkage for ejecting the lesson selector element at the end of the lesson, the aforementioned push button is provided to reject the card at any time after it has been inserted and locked in place.

The operation of the teaching machine during any one lesson or program can best be described by referring to two separate and distinct cycles of operation, the first of which is "selection," and the second of which is the "play" cycle.

First, the function and operation of the various members are described in the sequence of their activation during the normal operation of the machine.

Figure 8:
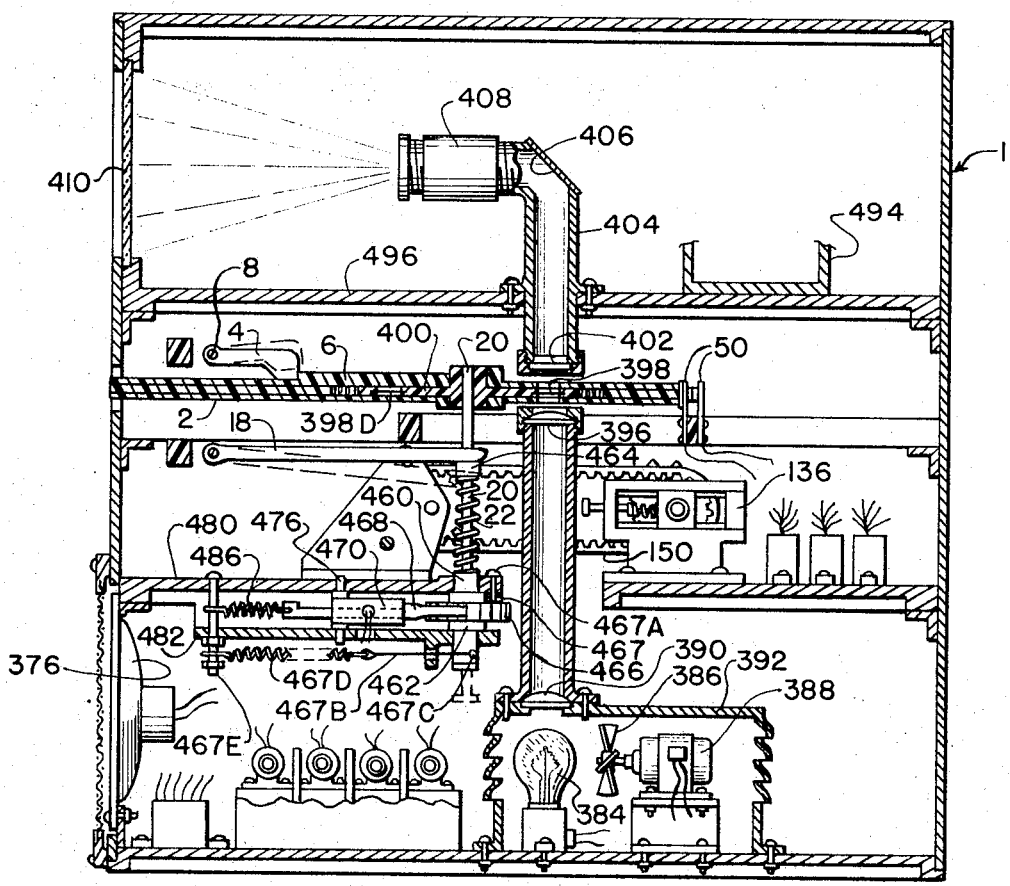
FIG. 8 is a view, mostly in section, taken on the line 8—8 of FIG. 16, looking in the direction indicated by the arrows.

The laminated lesson selector element corresponding to the desired lesson is first selected and inserted into the machine which is designated by the numeral 1, through the slot 1A formed in the front of the cabinet, FIG. 1. As the lesson selector card 2, FIGS. 26, 27 and 28, is inserted into the machine 1, a latch 4, FIG. 8, is raised by a projection 6 of the lesson selector element 2. Raising the latch 4 rotates a shaft 8 and a crank 10, FIG. 2. This causes translation of link 12, resulting in the counter-rotation of a crank 14, a shaft 16 and an arm 18, thus depressing a plunger 20, FIGS. 2 and 8, against the pressure of a spring 22, to allow the bottom of the lesson selector element 2 to pass over the top of the plunger 20.

Each lesson selector element 2 has a set of downwardly extending projections 24, 26, 28 and 30, FIG. 27. The projections 24 are so disposed on each lesson selector element 2 that the projections 24 and 28 are the same distance from the front of the lesson selector element and the projections 26 and 30 are the same distance from the front of the lesson selector element. However, the projections 24 and 26 or 28 and 30 are not necessarily equal distances from the front of the lesson selector element. The projections 24, 26, 28 and 30 engage corresponding upstanding projections 32, 34, 36 and 38, of the respective carriages 40, 42, 46 and 48, FIGS. 11, 9, 7 and 4, respectively.

Figure 4:
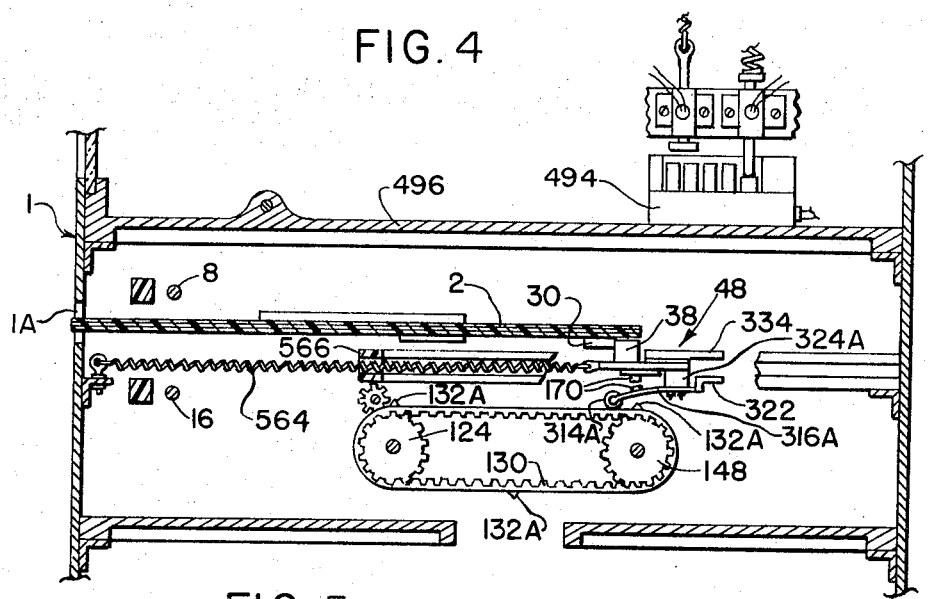
FIG. 4 is a view, partly in section, taken on the line 4—4 of FIG. 16, showing a counter belt of the teaching machine.
Figure 9:
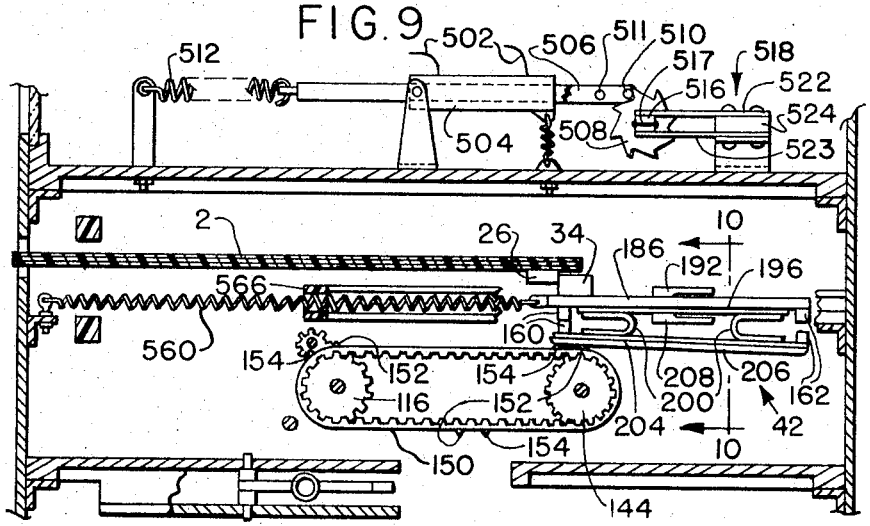
FIG. 9 is a view, partly in section, taken on the line 9—9 of FIG. 16, looking in the direction indicated by the arrows; and showing another counter belt of the teaching machine.
Figure 11:
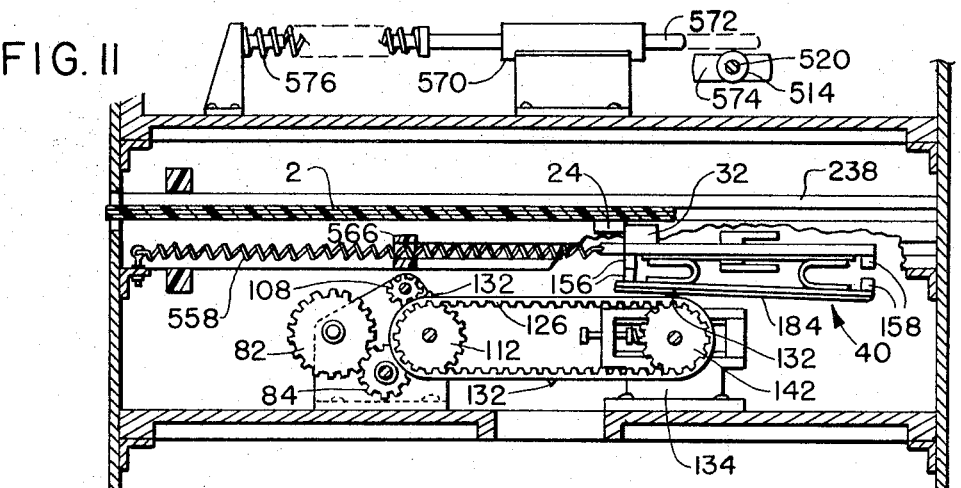
FIG. 11 is a view, partly in section, taken on the line 11—11 of FIG. 16, looking in the direction indicated by the arrows; and showing another counter belt of the teaching machine.

As the lesson selector element 2 is pushed into the machine on the tracks or guides 238 and 248, FIGS. 11, 16, 21, 24 and 25, the projections 24, 26, 28 and 30, FIG. 27, engage the respective projections 32, 34, 36 and 38, FIGS. 11, 9 and 4, thereby causing the carriages 40, 42, 46 and 48 to move along the respective tracks or guides until the lesson selector element 2 is fully inserted. When the lesson selector element 2 is fully inserted, the carriages are in a predetermined location, depending upon the disposition of the projections 24, 26, 28 and 30 on the lesson selector element 2.

With the lesson selector element fully inserted, the projection 6, FIGS. 8, 21, 31 and 32, will clear the latch 4, thus permitting the spring 22 to urge the plunger 20 up through the hole provided in the lesson selector element 2. Through the linkage 8, 10, 12, 14, 16 and 18, the latch 4 is forced down behind the projection 6, thus locking the lesson selector element 2 in place.

Figure 21:
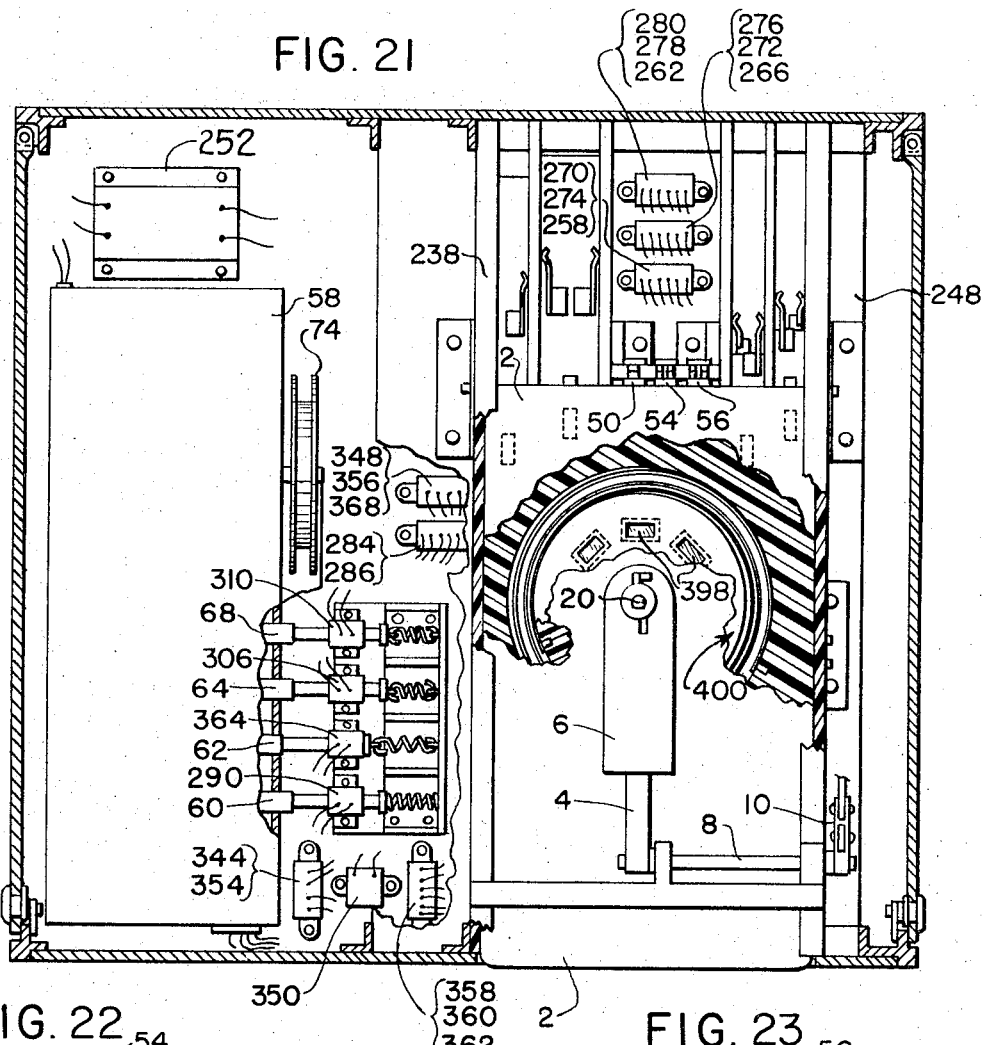
FIG. 21 is a sectional view taken on the line 21 — 21 of FIG. 16, looking in the direction indicated by the arrows, with portions being shown in section and with portions being broken away to show the details of construction.
Figure 22:
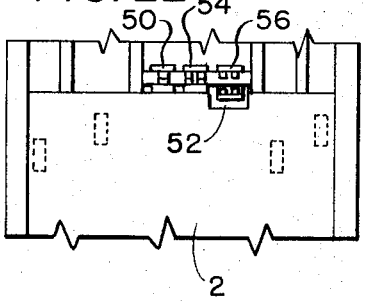
FIG. 22 is a view of part of a lesson selector element of the teaching machine.
Figure 23:
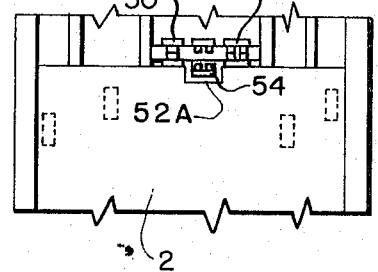
FIG. 23 is a view of part of another lesson selector element of the teaching machine, but showing it programmed for a different lesson.

When fully inserted, the lesson selector element 2 also closes the contacts of a power switch 50 and, depending upon the location of cutouts 52 or 52A, FIGS. 22 and 23, if used, closes the contacts of stereo channel selector switches 54 or 56, or both, FIGS. 21 and 31.

Figure 14:
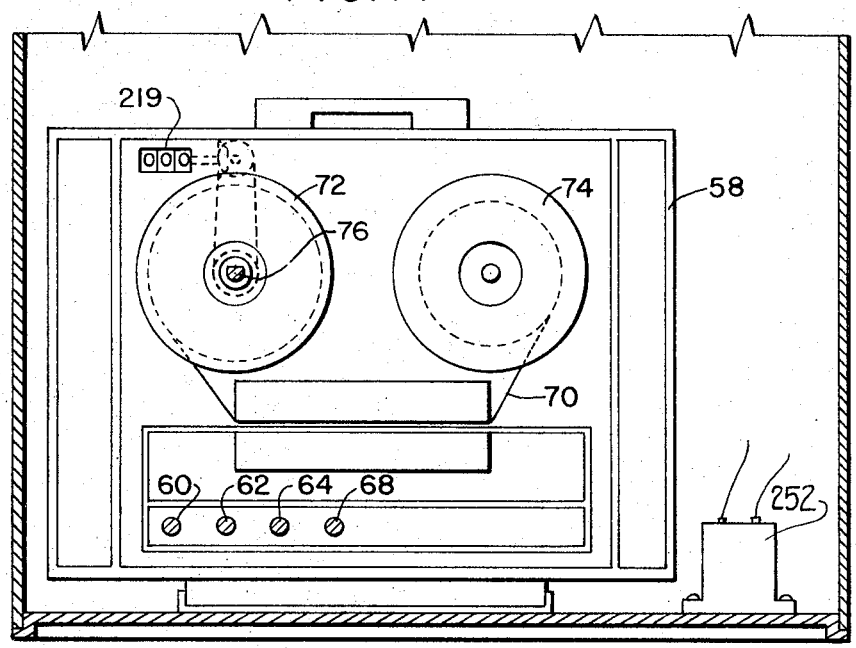
FIG. 14 is a front view of the stereo tape recorder of the teaching machine, taken on the line 14—14 of FIG. 16.

A standard stereo tape recorder 58 may be of any well known type, such as may be purchased on the open market. The basic control of the tape recorder 58 is by means of push buttons 60, 62, 64 and 68, which are respectively for Stop, Play, Rewind and Forward. A tape 70, FIG. 14, is carried on reels 72 and 74, which reels are also standard commercial products.

The tape 70 is not completely removed from the reel 72, so that any point on the tape can be located by counting revolutions of the reel 72 from some index point, which could be regarded as the beginning of the tape. The counting of the revolutions of the reel 72 is done mechanically by means of two banks of counters 219 of the interrupted gear type.

Figure 3:
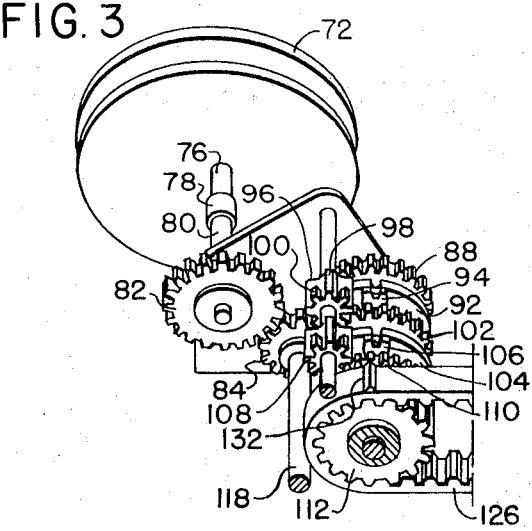
FIG. 3 is a perspective view of the magnetic tape reel drive of the stereo tape recorder of the teaching machine taken along the line 3—3 of FIG. 16.

Referring to FIGS. 3 and 16, it will be seen that the counters are driven from the reel 72 by means of a shaft 76, a coupling 78, a shaft 80, a drive gear 82, idlers 84 and 86, and driven gears 88 and 90. The driven gear 88 drives a slotted disc 92, which disc is provided with tooth-like projections 94. The projections 94 then drive teeth 98 of a pinion 96. The pinion 96 is provided with four teeth 98, which teeth are the full width of the pinion 96, and with an additional four teeth 100 which are approximately one-half the width of the pinion. The eight teeth of the pinion 96 drive a gear 102 which is rigidly connected to a slotted disc 104. The disc 104 is provided with tooth-like projections 106 which engage the teeth of a pinion 108 in the same manner as the projections 94 engage the teeth of the pinion 96. The pinion 108 drives a gear 110 in a manner identical to that by which the pinion 96 drives the gear 102.

Figure 6:
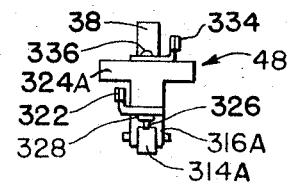
FIG. 6 is an end view taken on the line 6—6 of FIG. 5, looking in the direction indicated by the arrows.

One full revolution of the driven gear 88 results in one-fourth revolution of the pinion 96, which in turn, results in one-tenth revolution of the gear 102. The gear 102 may, therefore, be referred to as the "units counter." Likewise, one revolution of the gear 102, or units counter, results in one-tenth revolution of the gear 110, which may then be referred to as the "tens counter." The gear 110, or tens counter, is rigidly connected to a drum or sprocket 112, FIGS. 3 and 11, which in turn is rigidly connected to another slotted disc 114. The slotted disc 114 is identical to the slotted discs 92 and 104. The drum or sprocket 116, FIGS. 6 and 16, is driven through a pinion and gear arrangement which is similar to pinion 96 and gear 102 or pinion 108 and gear 110, to act as the "hundreth" counter.

The idler 86 is identical to the idler 84 and is rigidly connected to it by means of a shaft 118, FIG. 16. The idler 86 drives the gear 90, which gear is identical to the gear 99. The second bank of counters is driven by the idler 86, gear 90, and a system of slotted discs and pinions, in a manner identical to that just described, so that a gear 120 acts and the "units" counter, and drums or sprockets 122 and 124 act as the "tens" and "hundredths" counters, respectively.

The "tens" counters, sprockets 112 and 122, and the "hundredths" counters, sprockets 116 and 124 are provided with belts 126, 150, 128 and 130, respectively, as shown in FIGS. 2, 4, 7, 11 and 16. The belts 126, 150, 128 and 130 are identical, and each is of a length equal to three times the circumference of the respective sprockets 112, 116 and 112 and 124, except the belt 150 and the sprocket 116 are wider than the other sprockets and belts, and the belt 150 has two sets of projections thereon, as will be fully brought out hereinafter. The belt 126, FIG. 11, has three equally spaced projections 132 thereon, on the outer surface thereof, as seen in FIG. 11. An idler sprocket 142 is spaced from sprocket 112 so that the cog belt 126 is fitted in timed relation thereon and is held taut by a spring loaded journaled bearing.

Figure 24:
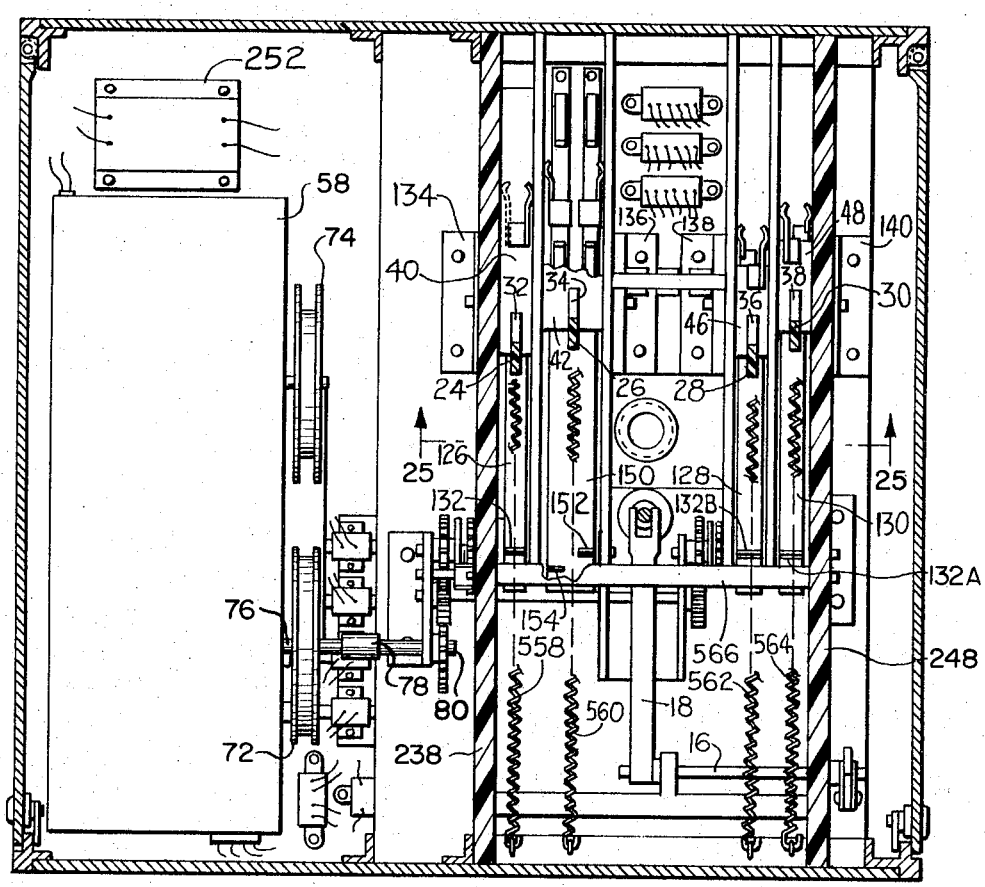
FIG. 24 is a sectional view taken on the line 24 — 24 of FIG. 16, looking in the direction indicated by the arrows.

The belt 150, FIGS. 9 and 24, has two sets of projections 152 and 154 on each outer side thereof, which sets of projections are on the outer face of the belt and are spaced apart one-third the length of the endless belt, with projections 152 being distributed in the same manner as the projections on the belt 126. The projections 152 and 154, which form a set, are spaced apart so that the distance between projection 152 and projection 154 is the distance of one-tenth the circumference of the drum, as will be seen in FIGS. 9 and 24. An idler sprocket 144 is a spaced distance from sprocket 116 so as to mount cog belt 150 in timed relation.

Figure 7:
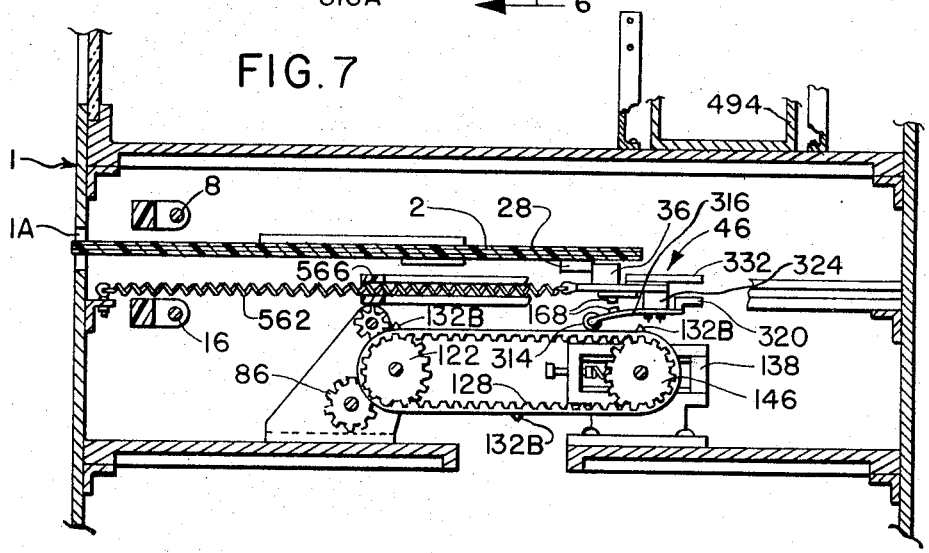
FIG. 7 is a sectional view, with parts shown in elevation, taken on the line 7—7 of FIG. 16, looking in the direction indicated by the arrows, showing a counter belt of the teaching machine.

An idler sprocket 146 is journaled a spaced distance from sprocket 122, which sprockets have belt 128 fitted thereon in timed relation, FIG. 7. The belt 128 has three spaced apart projections 132B thereon, which projections are equally spaced in the same manner as the projections on belt 126.

An idler sprocket is journaled a spaced distance from the sprocket 124, which sprockets have a belt 130 fitted thereon in timed relation, FIG. 4. The belt 130 has three, equally spaced projections therearound. Correct tension is maintained on the belts by spring tensioned journals 134, 136, 138 and 140 which support rotating idlers 142, 144, 146 and 148, FIGS. 7 and 4.

The slides or carriages 40, 42, 46 and 48 are slidably mounted in tracks or guides 238, 240, 242, 244, 246 and 248, FIG. 25, directly above the belts 126, 150, 128 and 130, respectively, in such manner that contact with the projections 132, 152 or 154, 132B or 132A will cause electrical contacts 156, 158, 160, 162, 164, 168 or 170 respectively to close, as will be fully brought out hereinafter, FIGS. 11, 9, 7, 4, 30 and 31.

The tape 70 has a plurality of lessons or programs recorded thereon. The purpose of the flexible belts, counters and associated mechanisms, as described above, is to determine the correct location of the tape to start the desired lesson or program. As set out above, this is accomplished by counting revolutions of the reel 72 from some index point, which could represent the beginning of the tape.

Upon insertion of the lesson selector element 2, FIG. 31, the contacts of the power switch 50 are closed and the carriages 40, 42, 46 and 48 have been located in their respective positions by the projections 24, 26, 28 and 30 on the lesson selector element 2, FIGS. 8, 9, 24 and 27. The circuit 168A, FIGS. 30 and 31, which supplies power to the tape recorder 58, is then energized. At this time, a signal must be supplied to the tape recorder 58 to determine whether the tape 70 is to be advanced or rewound.

Figure 12:
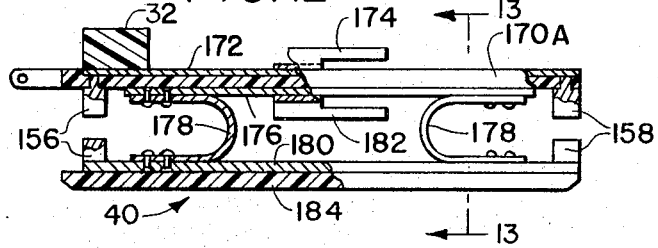
FIG. 12 is a side view, partly in section, on an enlarged scale, showing the contact arrangement of the device, as shown in FIG. 11.
Figure 13:
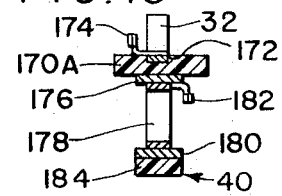
FIG. 13 is a sectional view taken on the line 13—13 of FIG. 12, looking in the direction indicated by the arrows.

The signal to determine whether the tape is to be advanced or rewound is provided by the combined action of the carriages 40 and 42, as follows. Referring to FIGS. 12 and 13, it will be seen that the carriage 40 consists of a sliding member 170A which is a non-conductor of electricity. An electrical conductor 172 is embedded in the non-conducting member 170A. The electrical conductor 172 connects a contact shoe 174 and the upper contacts 156 and 158. The bottom of the sliding member 170A is bonded to an assembly consisting of a conductor 176, and two springs 178, which are also electrical conductors, a second conductor 180, the lower contacts 156 and 158, and a second contact shoe 182. A single runner 184, of non-conducting material, is bonded to the bottom of the second conductor 180.

Referring to FIG. 11, it is to be seen that a physical contact between the runner 184 and one of the projections 132 on the belt 126 results in electrical contact between either or both sets of contacts 156 and 158. It is also seen, FIGS. 12 and 13, that electrical continuity between the shoes 174 and 182 is provided, whether either or both sets of contacts 156 or 158 are closed.

Figure 10:
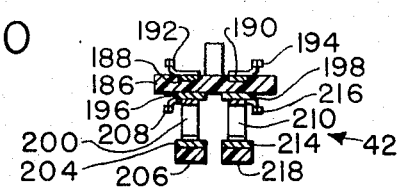
FIG. 10 is an enlarged sectional view, taken on the line 10—10 of FIG. 9, looking in the direction indicated by the arrows.

The carriage 42, which is best seen in FIGS. 9 and 10, is similar in construction and operation to the carriage 40, except the carriage 42 has two sets of runners, springs, contact shoes, etc. The carriage 42 also has four sets of electrical contacts, with two sets used in conjunction with each runner.

A sliding member 186, of the carriage 42, FIGS. 8 and 10, is made of non-conducting material. Conductors 188 and 190, FIG. 10, are embedded in the sliding member 186 and provide electrical continuity between the upper contacts and the contact shoes. The conductor 188 is connected to the upper contacts 160 and 162 and to a shoe 192. The conductor 190 is connected to the upper contacts 164 and 166 and to a shoe 194. Conductors 196 and 198 are bonded to the underside of the sliding member 186. The conductors 196 is fastened to springs 200, to which springs the conductor 204 is attached, which in turn carries the lower contacts 160 and 162. A runner 206 is made of insulating material and is bonded to the conductor 204. A shoe 208 is affixed to the conductor 196. The conductor 198 carries springs 210, the lower ends of which springs are affixed to a conductor 214. The conductor 214 carries the lower contacts 164 and 166. A shoe 216 is fastened to the conductor 198. A runner 218, of insulating material, is bonded to the conductor 214.

Figure 30:
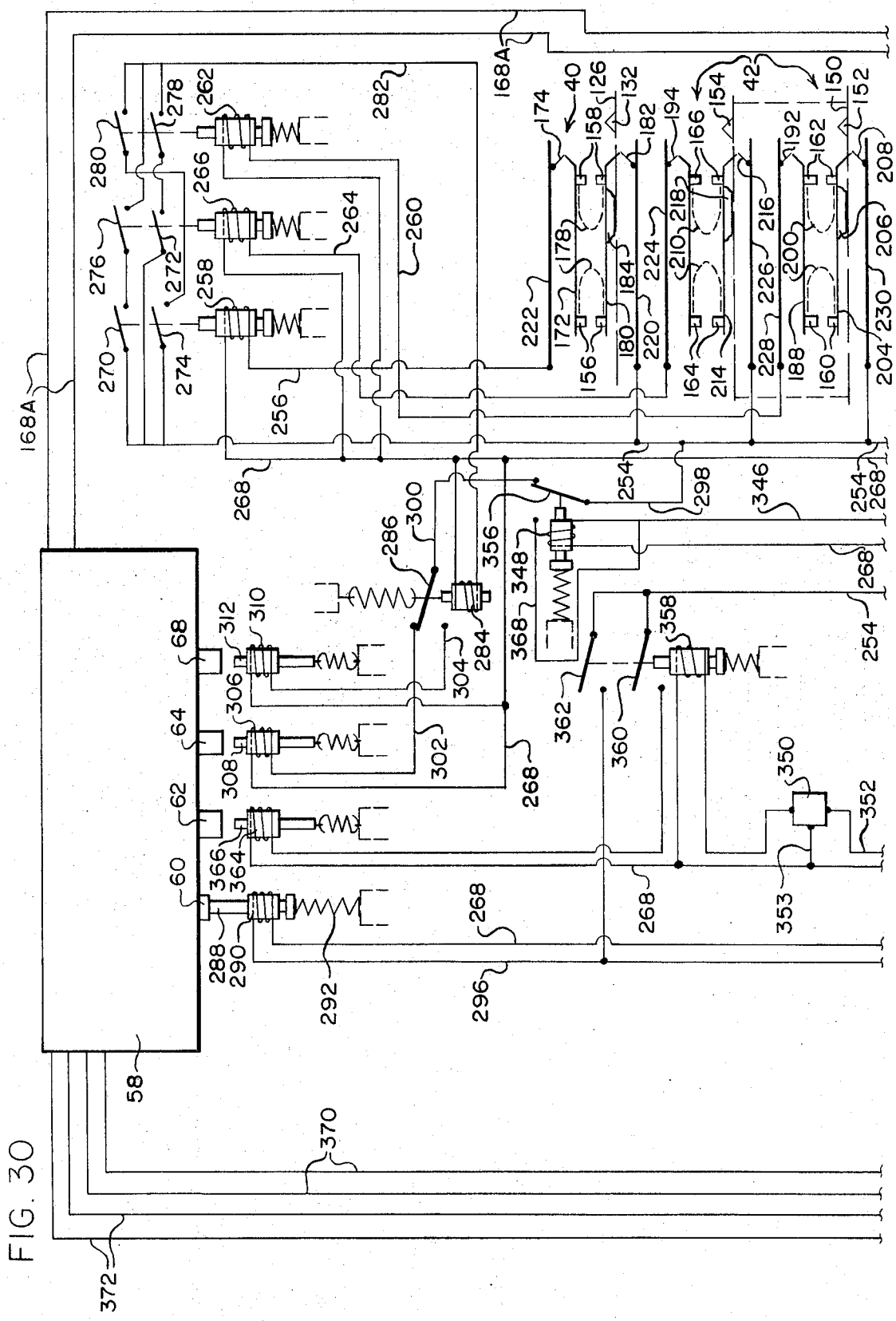

FIG. 30 shows a diagrammatic representation of the carriages 40 and 42. Referring to FIG. 30, it is to be noted that a physical contact between the runner 206 and a projection 152 on the belt 150 results in electrical contact between either or both sets of contacts 160 and 162, while physical contact between the runner 218 and a projection 154, also in belt 150, results in electrical contact between either or both sets of contacts 164 and 166.

The disposition of the projections 132 on the belt 126 and of the projections 152 and 154 on the belt 150 has been described above. It should be pointed out, however, that these projections are not necessarily in the positions, as shown in the FIGS. The location of these projections is determined by the position of the Tape 70, and consequently, the position of the belts 126 and 150 at the end of the lesson or program, when the machine was last in operation.

Referring to FIG. 14, it is to be understood that the direction of rotation of the reels 72 and 74, during normal operation of the tape recorder 58, is counterclockwise, with the tape 70 feeding from the reel 72 to the reel 74. The disposition of the gear 82, the idler 84 and the gear 88, FIG. 3, imparts rotation in the same direction (counterclockwise) to the belt 126.

Referring to FIGS. 9 and 11, it is to be noted that the projections 132, on the upper part of the belt 126, are at the tangent points of the belt, as are the projections 152, on the upper part of the belt 150. The linear distance between the tangent points is equal to the circumference of the drums or sprockets 112 and 116, if the radius is measured to the outside of the belts. The counters, as described above, are synchronized with a counter 219, FIG. 14, which is an integral part of the tape recorder 58. The positions of the belts 126 and 150, as shown in FIGS. 9 and 11, are at the index points, so that the counter 219, FIG. 14, would read "000." The belt 126, which may be referred to as the "tens belt," moves in increments of one-tenth revolution of the drum 112, while the belt 150, which may be referred to as the "hundredths belt" moves in increments of one-tenth revolution of the drum 116.

The location of the projections 24, 26, 28 and 30, on the lesson selector element 2, FIG. 27, is determined by the reading on the counter 218, which is integral with the tape recorder 58, at the beginning of the desired lesson or program. The lesson selector element 2, when fully inserted and locked in place by the latch 4, locates the position of the carriages 40, 42, 46 and 48.

Referring to FIGS. 9 and 11, it is evident that the location of the left end of the carriages 40 and 42 provides an indication of the location of the start of the desired lesson or program. If the projection 152 on the top of the "hundredth belt" 150 is to the left of the carriage 42, the belt must be rotated clockwise to reach the proper point, or the tape must be rewound. If the projection 152 is directly under the left hand end of the carriage 42, but the projection 132, on the top of the belt 126, is still to the left of the carriage 40, the tape must be rewound.

However, if the projection 152 is under the carriage 42 and the projection 132 is under the carriage 40, or if both projections 152 and 154 are under the carriage 42, the tape must be advanced. From the foregoing, it may be deduced that, regarding the carriages 40 and 42 and the projections 152 and 154 on the belt 150, no physical contact between the projections on the belts and the runners on the carriages 40 and 42 or physical contact between one projection and one runner will result in rewinding of the tape 70, whereas physical contact between more than one projection and runners will result in the advancing of the tape 70 to the desired location.

Figure 25:
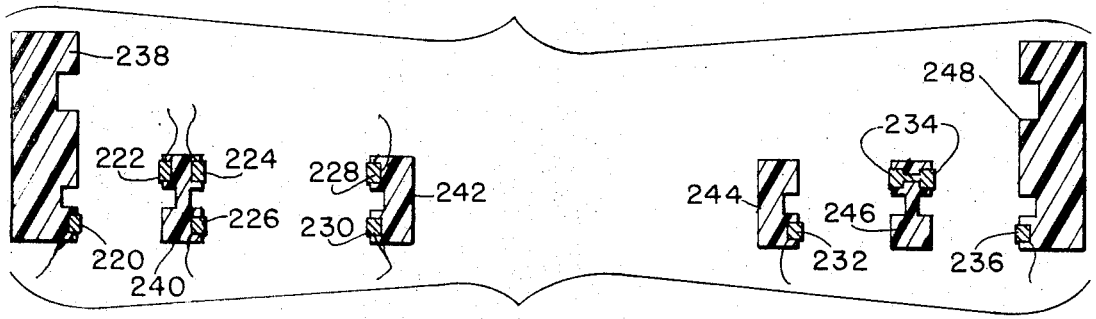
FIG. 25 is a sectional view taken on the line 25 — 25 of FIG. 24, looking in the direction indicated by the arrows, showing the conductors and guide arrangement of the teaching machine.

Referring to FIG. 25, it will be seen that electrical conductors or rails 220, 222, 224, 226, 228, 230, 232, 234 and 236 are embedded in non-conductor tracks or guides 238, 240, 242, 244 246 and 248. Referring to FIGS. 30 and 31, it has already been established that the contacts of the switch 50 have been closed by the full insertion of the lesson selector element 2, which is locked in place by the latch 4. The circuit 168A, which supplies power to the tape recorder 58, has been energized. The switch 50 also energizes a circuit 250 to supply power to a rectifier 252 which in turn supplies low voltage direct current to the various control circuits. A conductor 254 supplies low voltage direct current to the rails 220, 226 and 230. The rail 222 is connected by a conductor 256 to a relay 258. The rail 228 is connected by a conductor 260 to a relay 262. The rail 224 is connected by a conductor 264 to a relay 266.

The foregoing circuits are completed by connecting the relays to a conductor 268 which acts as a common ground or return conductor. The conductor 254 also supplies power to switches 270, 272 and 274. A switch 276 is connected in series with a switch 270. A switch 278 is connected in series with the switch 272. A switch 280 is connected in series with the switch 274. A conductor 282 connects the switches 276, 278, and 280 to a relay 284 which operates a switch 286. The switches 270 and 274 are controlled by the relays 258. The switches 272 and 276 are controlled by the relay 266. The switches 278 and 280 are controlled by the relay 262. All the aforementioned switches are normally open unless actuated by their respective relays.

As explained above, physical contact between the belt projections, such as 132, and the runners, such as 184, results in closing the contacts, such as 156 or 158, or both. The closing of these contacts results in the completion of an electrical circuit from the conductor 254 through the rail 220, the shoe 182, the contacts 156 and 158, or both, the shoe 174, the rail 222, the conductor 256, the relay 258, thereby causing the switches 270 and 274 to close. Likewise, a physical contact between the projection 152 and the runner 206 results in energizing the relay 262, thereby closing the switches 278 and 280. A physical contact between the projection 154 and the runner 218 results in the relay 266 being energized and the closing of the switches 272 and 276 by said relay.

It is obvious that, if no physical contact exists between any of the belt projections and the runners of the carriages, the relays 258, 262 and 266 remain de-energized and the switches 270, 272, 274, 276, 278 and 289 all remain open, the relay 284 remains de-energized and a switch 286 remains in the position shown in FIG. 30. It is also obvious that if only one physical contact is made, one of the relays becomes energized, resulting in the switches associated with such relay being closed. However, an examination of the arrangement of the switches 270 and 280 discloses that these switches are arranged in a series of two switches in such manner that two relays must be energized before the conductor 282 and the relay 284 may be energized. It therefore follows, that there must be at least two physical contacts between the belt projections and the corresponding carriage runners before the relay 284 is energized.

The stop button must be released before either the rewind button 64 or the advance button 68 can be depressed. Obviously, as shown in FIG. 30, an armature 288 of solenoid 290 is normally forced against the stop button 60 by action of a compression spring 292. When the rectifier 252 is energized, as described above, conductors 254 and 296 are energized, causing the solenoid 290 to become energized, with the circuit being completed by the common ground or return conductor 268. When the solenoid 290 is energized, the armature is drawn away from the button 60 against the pressure of compression spring 292. The stop button 60 is thus released.

Conductors 298 and 300 are energized by the conductor 254 and the position of the switch 286 determines whether the conductor 302 of the conductor 304 is energized. The action of the selector switches 270 to 280 in energizing the relay 284 or permitting it to remain de-energized has been previously described. The position of the switch 286 is controlled by the relay 284. With the switch 286 in the position shown in FIG. 30, the conductor 302 and a solenoid 306 are energized, causing an armature 308 to depress the button 64. The circuit is completed by the common ground 268. When the relay 284 is energized, the switch 286 is moved to the position which energizes the conductor 304 and a solenoid 310, thereby causing an armature 312 to depress button 68. The circuit is again completed by the common ground 268.

When the above described circuits are completed or closed, the stop button 60 has been released and, depending on the disposition of the switch 286, either the rewind button 64 or the advance button 68 has been depressed, causing the tape 70 to be either advanced or rewound. The reel 72 rotates and the shaft 76, the coupling 78, the gear 82, etc., rotate with said reel. The counters, drums and belts rotate in the same direction as the reel 72.

The operations, as described above, after full insertion of the lesson selector element 2 and the resulting closure of the switch 50, are practically instantaneous, and constitute part of the selection cycle.

The second part of the selection cycle, which will be described more in detail hereinafter, involves the second bank of sprockets or counters 120, 122 and 124, FIG. 16, and the carriages 46 and 48, FIGS. 7, 4 and 31.

The idler gear 86, FIG. 16, is identical to the idler gear 84 and is connected thereto by shaft 118. The gear 90, which is driven by idler gear 86, is identical to gear 88, which is driven by idler gear 84. The sprocket 122 rotates at the same time as the sprocket 112 and the sprocket 124 rotates at the same time as the sprocket 116. The belt 128, FIG. 7, and the projections 132B thereon operate in unison, the belt 126 and its projections 132 also operate in unison. The belt 130 and its projections 132A operate in unison with belt 150 and the projections 152 and 154 thereon. The belt 130 does not require an auxiliary set of projections, such as the projections 154 on belt 150.

As previously set out, the projections 24 and 28, on the lesson selector element 2, are located at equal distances from the front of the lesson selector element, and the projections 26 and 30 are also located at equal distances from the front of the lesson selector element. As further disclosed, the locations of these projections is determined by the location of the tape 70 with reference to some index point, at the start of the desired lesson or program. It therefore follows, that the location of the carriages 46 and 48, after being set by the projections 28 and 30 on the lesson selector element 2, indicate the position or location of the tape 70 at the start of the desired lesson or program.

As shown in FIGS. 4, 5, 6, 7 and 31, the carriages 46 and 48 are substantially identical in structure. The carriage 46, as particularly shown in FIGS. 7 and 31, has a leaf spring 316 mounted thereon, which resiliently urges a roller 314 against the outer surface of belt 128, which spring 316 has an electrical contact point thereon, which together with an electrical contact point on body 324, form a pair of electrical contact points 168, which contacts 168 are closed when one of the projections 132B on belt 128 engages roller 314. A contact shoe 320 is formed on the end of leaf spring 316 on the carriage 46 and is in contact with rail 234.

The carriage 48 as particularly shown in FIGS. 4, 5, 6 and 31, has a leaf spring 316A mounted thereon, which resiliently urges a roller 314A against the outer surface of belt 130. The spring 316A has an electrical contact point thereon, which together with an electrical contact point on body 324A, form a pair of electrical contacts 170, which contacts are closed when one of the projections on belt 130 engages roller 314A. A contact shoe 322 is formed on the end of leaf spring 316A on carriage 48 and is in contact with rail 236.

The body 324A on carriage 48 serves as a sliding member and is made of non-electrical conducting material in which are embedded bolts or screws 326 having nuts 328 thereon, to bindingly engage the leaf spring 316A to body 324A. The body 324A of carriage 48 has a projection 38 formed thereon, which projection 38 is engageable by the projection 30 on the lesson selector element 2, when the lesson selector element is moved into the position as shown in FIG. 4.

Figure 5:
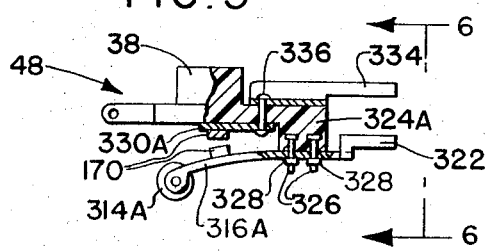
FIG. 5 is a view, partly in section, and on an enlarged scale, of the contact arrangement as shown in FIG. 4.

Thecarriage 48 is shown more in detail in FIGS. 5 and 6, and, when taken with FIG. 31, shows an electrical conductor strip 330A bonded to the lower part of body 324A, with the contact shoe 334 being connected thereto by an electrical conductor rivet 336, as will best be seen in FIG. 5, to provide electrical continuity between the strip 330A and the electrical conductor shoe 334, which shoe engages conductor rail 232.

As above mentioned, the carriage 46 is substantially identical with carriage 48, with the contact 168 on carriage 46 closing a circuit when one of the projections 132B on the outer surface of belt 128 engages roller 314. The contact shoe 320 on carriage 46 is substantially identical with shoe 322 on carriage 48 and serves the same purpose, and the shoe 332 on carriage 46 is substantially identical with shoe 334 on carriage 48 and engages the electrical conductor rail, FIGS. 7, 25 and 31. The projection 28 on lesson selector element 2 engages projection 36 on carriage 46, FIG. 7, to move the carriage along the rails to the desired position.

FIGS. 4 and 7 show that, as the projections 132A on belt 130 or projections 132B on belt 128 pass under the roller 314A or the roller 314, respectively, electrical contact is made between the upper and lower contacts 170 on carriage 48 or the upper and lower contacts 168 on the carriage 46, thus completing the circuit between the shoes 322 and 334 on the carriage 48, or between the shoes 320 and 332 on carriage 46. It is to be noted, however, by referring to FIG. 31, that the rail 236, the shoe 332, the contacts 170, the shoe 334, and the rail 234, the shoe 332, the contacts 168, the shoe 320 and the rail 234, form an electrical series or circuit. The physical location of the shoe 320 and shoe 332 is reversed in the diagrammatic representation, FIG. 31, for the sake of clarity.

As the reel 72 rotates, FIGS. 3 and 14, as required to bring the tape 70 to the position to start the desired lesson or program, the projections 132B on the belt 128 pass under the roller 314 on carriage 46 several times, causing the contacts 168 to close. Since this is a series connection, the circuit between the rails 236 and 232 is not completed until one of the projections 132A, on the belt 130 reaches the roller 314A of the carriage 48, causing the contacts 170 to close, whereupon, the next time one of the projections 132B on the belt 128 causes the contacts 168 to close, the circuit between the rail 236 and the rail 232 is completed.

When the circuit, as described above, is completed, the current from the conductor 254, through the carriages 48 and 46, as described, and into the rail 232, whence the current passes into a conductor 342 through the winding of the relay 344, and back to the common ground 268. The current also passes from the conductor 242 to a conductor 346 through the winding of a relay 348, and back to the common ground 268. A conductor 352 is connected to conductor 342 so as to energize time delay element 350. With this portion of the circuit being completed by conductor 353 which connects the time delay element to the common ground 268.

When the conductor 342 is energized, as described above, three things happen simultaneously. A switch portion 354 of the relay 344 breaks the circuit through conductor 296 leading to the "Stop" solenoid 290, thus permitting the spring 292 to depress the "Stop" button 60 of the tape recorder 58. A switch portion 356 of the relay 348 breaks the circuit through conductor 300, switch 286 and conductor 302 leading to the tape "Rewind" solenoid 306, or, through the circuit 304 to the "Advance" or "Forward" solenoid 310 by the respective switching action, releasing the push buttons 64 or 68, respectively of the tape recorder 58 by such action. The time delay element 350 is energized to provide sufficient time for the desired functions to be performed.

After a predetermined period of time has elapsed, the time delay element 350 causes the winding of a relay 358 to be energized by completing the circuit from the conductors 342 and 352 through the winding of the relay 358 and back to the common ground 268, FIGS. 30 and 31. Switch portions 360 and 362 of the relay 358 will then be closed. Closing the switch 360 energizes the coil of a "Play" solenoid 364, thus causing armature 366 to depress the button 62 of the tape recorder 58. The closing of the switch 362 energizes the winding of the solenoid 290 by by-passing the switch portion 354 of the relay 344, causing the armature 288 of the solenoid 290 to be withdrawn, thereby releasing the push button 60 of the tape recorder 58.

The operations described above, terminate with the depressing of the "Stop" button 60 of the tape recorder 58, which marks the end of the selection cycle. The depressing of the "Play" button 62, after an appropriate delay furnished by the time delay element 350, marks the beginning of the "Play" cycle.

As the tape recorder 58 begins to "Play," that is, the "Play" cycle begins, the reel 72 rotates, which causes the counters to start their intermittent rotation, as described, and the belts 126, 128, 130 and 150 all begin to move, since they are driven by the counters, drums or sprockets. As the belt 128 starts to move, the projections 132B would leave the roller 314 of the carriage 46, thereby permitting the contacts 168 to open, thus breaking all of the circuits described, at the end of the selection cycle and the beginning of the "Play" cycle. This would immediately cause the machine to revert to the beginning of the selection cycle. To prevent this, a conductor 368 is added in the form of a loop, in conjunction with the relay 348. The conductor or loop 368 permits the power to the conductor 342 and the winding of relay 348 to be obtained directly from the conductor 254, thereby permitting the circuits just described to be held closed for the remainder of the "Play" cycle.

The number of lessons or programs included in the tape 70 may be effectively doubled by recording a separate lesson or program on each stereo track and utilizing the cut-out of notches 52 and 52A, FIGS. 22 and 23, in the lesson selector element 2 and the channel selector switches 54 and 56, FIG. 31.

The audio circuit, external of the tape recorder, comprises a left hand circuit 370, which extends from the tape recorder 58 to a set of contacts on the selector switch 54, and a right hand circuit 372, which extends from the tape recorder 58 to a set of contacts on the selector switch 56, FIG. 31. A circuit 374 extends from the second set of contacts on the switch 56 to a speaker 376 and jumpers 378 and 380 connect the corresponding contacts of the switches 54 and 56, thus connecting the circuit 374 to either switch. If no cut-outs or notches are used in the lesson selector element 2, the contents of both channels will be supplied to the speaker 376.

The visual portion of the lesson or program provided by the machine comprises a projection system, which system projects the enlarged image of a series of pictures upon a translucent screen 410, FIGS. 1, 8 and 16, which is built into the front of the cabinet which houses the machine, thereby giving the appearance somewhat of a television screen. The pictures are provided by a series of transparencies 398, FIGS. 8, 21, 27 and 29, mounted in a laminated plastic disc which disc is rotatably mounted in the lesson selector element 2.

By referring to FIG. 8, it is seen that the projection system comprises a light source 384 which is cooled by a fan 386, which fan is powered by a motor 388. A condensing lens 390 is situated at the juncture of a housing 392 and a light-tight tube 394. A focusing lens 396 is mounted at the top of the tube 394, directly below a transparency 398, which is permanently assembled between the laminations of a disc 400 which is permanently assembled within the lesson selector element 2. Other transparencies, such as 398B, 398C, etc, are also assembled within the disc 400 in a manner identical to the transparency 398.

The portion of the projection system above the lesson selector element 2, FIG. 8, comprises a transparent sealing member 402 which is located at the bottom of the light-tight tube 404, a mirror 406, and a system of projection lenses contained in a threaded tubular housing 408, which projects the desired image upon a translucent screen 410.

The details of the structure of the lesson selector element 2 and the associated parts are shown in FIGS. 26, 27 and 28 and 29. The lesson selector element 2 is rectangular in shape, as shown in exploded condition in FIG. 28. The projection 6 and an upstanding lug or stop 414 are formed integrally on an upper lamination 412 of the lesson selector element 2. A center lamination 416 surrounds the disc 400 and a coil spring 418. A lower lamination 420 of the lesson selector element 2 contains the integrally formed projections 24, 26, 28 and 30, and an additional projection 422, which serves as a journal for the lower portion of a hub 424 of the disc 400.

The disc 400 is of laminated structure and comprises, in part, an upper lamination 426. The upper portion of the hub 424 and a projection 428 are integrally molded on the upper lamination 426. When the lesson selector element is assembled, the projection 428 registers with the upstanding lug or stop 414. A lower lamination 430 is integrally molded with the lower portion of the hub 424. The transparencies 398, 398B, 398C, etc. are assembled between the laminations 426 and 430 in selectively a manner whereby each transparency is in register with an opening, such as 432, 432B, 432E, etc., in the upper lamination 426, and other openings, such as 434, 434A, 434B, etc., in the lower lamination 430.

The transparency to be shown is initially required to be in line with, and closest to, a stop surface 436 of the projection 428. The rest of the transparencies are then placed in a sequential arrangement in a clockwise direction from the transparency to be shown initially, as shown in FIG. 29. A D-shaped bore 438 through the hub 424 must also be correctly indexed with respect to the stop surface 436.

The coil spring 418 is provided with lugs or pins 440 and 442 which engage a hole 444 in the outer periphery of the disc 400 and a hole 446 in an opening 448 of the center lamination 416, respectively, FIGS. 27 and 28.

The hub 424 of the disc 400 is journaled in holes 450 and 452 in the upper and lower laminations 412 and 420, respectively of the lesson selector element 2. The upper lamination also contains a slot 454, which connects with one side of the hole 450 to permit the projection 428 to pass through during the operation of assembling the lesson selector element 2. Openings 456, in the upper lamination and openings 458 in the lower lamination are in register with the transparency 398 to be shown initially, so that the light emerging from the lower tube 394, FIG. 8, passes through the opening 458, the opening 434, the transparency 398, the opening 432, the opening 456, FIGS. 26, 27 and 29, and into the upper tube 404, FIG. 8.

If the lesson selector card 2 is to incorporate the channel selection feature, the cut-out 52 or the cut-out 52A, FIGS. 22 and 23, is included. The lesson selector element 2, when completely assembled and ready for use, houses the assembled disc 400 and the coil spring 418. The disc 400 is free to rotate within the lesson selector element 2, but the action of the coil spring 418 causes the stop surface 436 of the projection 428 to bear against the upstanding lug or stop 414, thereby placing the initial transparency 398 in register with the openings 456 and 458 in the upper and lower laminations 412 and 240, respectively of the lesson selector element 2.

The upper portion of the shaft 20 embodies a D-shaped cross-section to register with the D-shaped bore 438 in the hub 424 of the disc 400, FIGS. 8, 21, 26 and 29. Due to the D-shape of the bore 438, FIG. 8, the disc 400 is placed in a driven relationship with respect to the shaft 20. The lower portion of the shaft 20 also embodies a D-shaped cross-section which engages a corresponding D-shaped bore in flanged sleeves 460 and 462, as will best be seen in FIGS. 8, 19 and 32. The upper surface of the sleeve 460 serves also as a seat for the lower end of the spring 22. The shaft 20 is also provided with a collar 464 having an upper surface which serves as a bearing surface for the arm 18, while the lower surface of the collar 464 serves as a shoulder for the upper end of the spring 22. A ratchet wheel 466 is retained between the flanged sleeves 460 and 462, FIGS. 8, 19 and 32, and is maintained in driving relation with the shaft 20 by the D-shaped bore which engages the lower portion of the shaft 20, which also embodies a D-shaped cross-section in this area.

A projection 467 is provided on the sleeve 460. The projection 467 is indexed with respect to the D-shaped bore of the sleeve in such manner as to orient the shaft 20, so that the upper D-shaped cross-section of the shaft passes freely through the D-shaped bore 438 in the hub 424 of the disc 400, when the projection 428 of the disc 400 bears against the stop 414 of the lesson selector element 2 and the projection 467 bears against a pin or stop 467A in a support member or shelf 480, FIGS. 8, 19 and 32.

Figure 2:
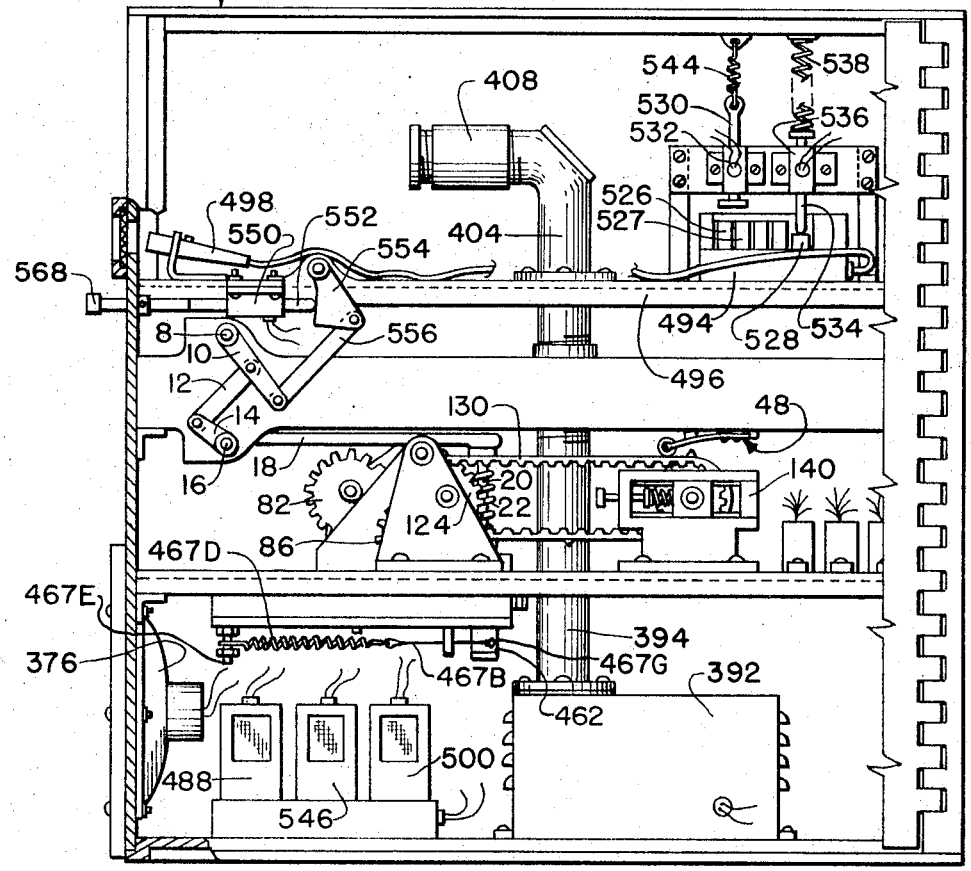
FIG. 2 is a side view of the teaching machine of FIG. 1, with the right side removed, and with parts shown in section to bring out the details of construction.

A flexible cord 467B, FIGS. 2, 8 and 18, is attached to the cylindrical surface of the lower sleeve 462 by suitable attaching means 467C. A tension spring 467D is affixed to the other end of the cord 467B. The tension spring 467D is anchored to the bottom portion of a bolt or screw 467E, as may best be seen in FIGS. 2, 8, 18 and 32.

An armature 468, of solenoid 470, is provided with teeth 472, which teeth engage the teeth of the ratchet wheel 466, as shown in FIGS. 19 and 32. The solenoid 470 drives the ratchet wheel 466 in a counterclockwise direction. A pawl 474 is provided to prevent rotation of the ratchet wheel 466 in the opposite direction. The armature 468 of the solenoid 470 is provided with stops which limit the stroke of the armature to that required to produce an arcuate rotation of the ratchet wheel 466 equal to the angular distance between the centers of two consecutive transparencies, such as 398, or 398B or 398C, as shown in FIG. 29.

The solenoid 470, FIGS. 8 and 19, and the pawl 474 are provided with lugs or projections 476 and 478, respectively, which lugs engage corresponding holes in the support member or shelf 480 and a support plate 482, respectively. The lugs or projections 476 and 478 act as pivot pins to permit the teeth 472 of the armature 468 to pass over the teeth of the ratchet wheel 466 during the retraction stroke and to permit the tooth of the pawl 474 to pass over the teeth of the ratchet wheel during the advancing or action stroke of the armature 468 or the solenoid 470. A spring 484 provides the necessary tension to assure engagement of the teeth of the armature 468 and the pawl 474 with the teeth on the ratchet wheel 466. A spring 486 is provided to return the armature 468 of the solenoid 470 during the retraction stroke.

In addition to the aforementioned features, the solenoid 470 and the pawl 474 are each provided with lugs or extensions 487 and 487A, respectively. The purpose of the lugs or extensions 487 and 487A is explained as follows. Prior to the full insertion of the lesson selector element 2, a compression spring 487B forces an armature 487C of solenoid 487D, FIGS. 19 and 32, against the lugs or extensions 487 and 487A, thereby causing the solenoid 470 and the pawl 474 to swing outward to disengage the teeth of the armature 468 and the tooth of the pawl 474 from the teeth of the ratchet wheel 466. With the teeth thus disengaged, the spring 467D, FIG. 18, causes the cord 467B to rotate the lower sleeve 462 in a counterclockwise direction until the projection 467, FIG. 19, on sleeve 460 contacts the pin or stop 467A. This permits the upper end of the shaft 20 to pass freely through the D-shaped bore 438, FIGS. 26 and 27, in the hub 424 of the disc 400.

When the lesson selector element 2 is fully inserted, the switch 50 is closed, FIG. 31, which in turn energizes the winding of a solenoid 487D, FIG. 32. This causes the armature 487C to be drawn away from the lugs or extensions 487 and 487A. This permits the spring 484 to bring the teeth 472 of the armature 468 and the tooth of the pawl 474 into engagement with the teeth of the ratchet wheel 466.

The operation of the disc 400 is synchronized with the contents of the tape 70 in such manner as to provide the placing of the proper transparency 398 between the light-tight tubes 394 and 404, as shown in FIG. 8, so that the desired picture will be projected on the translucent screen 410.

In order to change the picture appearing on the screen 410, an ultrasonic signal is superimposed on the lesson or program recorded on the tape 70. The ultrasonic signal, which is inaudible to the human ear, is capable of being received and recognized by a sonic, ultrasonic or whistle switch 488 which is tuned to the particular frequency or the ultrasonic signal. As shown in FIG. 32, the sonic switch 488 receives power from conductor 491 which is connected to conductor 490, which is connected to the rectifier 252, with the circuit being completed by the common ground 268. A circuit 492 is provided from the sonic switch 488 to the winding of the solenoid 470, so that, upon the provision of the ultrasonic signal, which was superimposed on the program recorded on the tape 70, the solenoid is energized. When the solenoid 470 is energized, the armature 468 extends through the amount of travel permitted by the stops, and rotates the disc 400 sufficiently to align the next transparency with the above described optical system.

Another feature of the teaching machine is the provision of means which allows the student to reply vocally by permitting the recording of the student's answers to questions or otherwide recording the student's reaction to the lesson. A cassette recorder 494, FIGS. 2 and 32, is provided to record the student's reply and/or remarks. The cassette recorder 494 may be placed in any convenient location on the machine, such as resting on a shelf 486 to which the upper light-tight tube 404 is affixed. The cassette is accessible through door 495, FIG. 1, in the cabinet 1, to enable the cassette cartridges to be removed and replaced without removal of the machine from the cabinet. The door 495 may be maintained locked, as desired. A microphone 498, FIGS. 2 and 32, of the cassette recorder 494 is placed adjacent an opening 499 in the front of the housing, FIG. 1 into which the student may voice his comments, etc.

Since the cassette recorder records the reactions, etc., of a number of students throughout the course of a period of use of the teaching machine, it is undesirable that the casette recorder be turned on for recording continuously. For this reason, means is provided for turning the cassette recorder 494 on and off at intervals, determined by the instructor or whatever person records the lessons provided on the tape 70. A second ultrasonic signal, the frequency of which is different from the first described ultrasonic signal, is superimposed, at intervals, on the tape 70, to turn the cassette recorder 494 on and off, FIGS, 2 and 32. A second sonic switch 500, tuned to the second ultrasonic signal, is provided. The second sonic switch is connected to the conductors 491 and 268.

A circuit 502 connects the sonic switch 500 to the winding of the solenoid 504. In response to the ultrasonic signal to which it is tuned, the sonic switch 500 sends an electrical impulse to the winding of the solenoid 504, thereby causing the armature 506 to extend against the tension of spring 512 by an amount sufficient to rotate the ratchet wheel 508 a quarter of a turn. By referring to FIG. 9, it will be seen that the armature 506 of the solenoid 504 is provided with pins 510 and 511. The pin 510 engages the teeth of the ratchet wheel 508 at the beginning of the stroke of the armature 506 and the pin 511 engages the teeth of the ratchet wheel 508 at the end of the stroke.

The ultrasonic signals are in the form of beeps, or signals of short duration, so that during the duration of the signal, the sonic switch will furnish an electrical impulse to the windings of the associated solenoids. At the end of the electrical impulse, the armature 506 is returned to the original retracted position thereof by a tension spring 512.

As shown in FIG. 32, the ratchet wheel 508, a "Butterfly" wheel 514, a rotating element 516, of a sequence switch 518, and a shaft 520 comprise a rigid assembly which rotates as a unit about the axis of the shaft 520.

Figure 15:
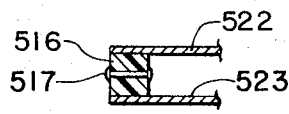
FIG. 15 is an enlarged fragmentary longitudinal sectional view of the sequence switch as shown in FIG. 32.

The sequence switch 518 comprises the rotating element 516 and spring contacts 522 and 523 which are fastened to a stationary block 524. The rotating element 516 comprises insulating material through which an electrical conductor, in the form of a rivet 517, is passed to provide contacts on two opposite surfaces, as may best be seen in FIGS. 9, 15 and 32. The operation of the cassette recorder 494, when used in conjunction with the operation of the teaching machine, involves only the recording aspect thereof. For the playback of the student's replies and reactions, the instructor removes the tape cartridge of the cassette recorder 494 and plays back the tape cartridge on an independent cassette.

The cassette recorder 494 is set into operation by simultaneously depressing "Record" and "Play" buttons 526 and 527, FIG. 32. Depressing the "Stop" button 528 turns off the cassette recorder 494. The operation of depressing the buttons 526 and 527 is accomplished by an armature of a solenoid 532. The button 528 is controlled by an armature 534 of a solenoid 536.

Commercial cassette recorders are available, which are powered by a battery contained within the recorder. The circuit 250, FIGS. 31 and 32, powers the cassette recorder 494, whenever the lesson selector element 2 closes the switch 50. This elminates the need for batteries. The adapter built into the cassette recorder 494 reduces the 117 volts to the proper cassette voltage. The cassette recorder is controlled in operation as follows: Prior to receiving the first ultrasonic signal of the frequency to which the sonic switch 500 is tuned, the "Stop" button 528 is held in the depressed position by the armature 534 of the solenoid 526. The armature 534 is held in the extended position by a compression spring 538.

When the proper ultrasonic signal is received, the sonic switch 500 sends an electrical impulse to the winding of the solenoid 504, causing the armature 506 to extend by an amount sufficient to rotate the ratchet wheel 508 a quarter of a turn. This also rotates the rotating element 516 of the sequence switch 518 a quarter of a turn, placing the ends of the rivet 517 against the spring contacts 522 and 523, thus completing a circuit including conductors 490, 540 and 542, the windings of the solenoids 532 and 536 and the common ground 268. The armature 532 is extended to depress the buttons 526 and 527, while the armature 534 of the solenoid 536 is retracted, thus releasing the button 528. It is to be noted that, as seen in FIG. 32, the current passes through the windings of the solenoids 532 and 536 in opposite directions, so that the armature 530 and the armature 534 move in opposite directions during the power stroke of the solenoids.

Upon termination or expiration of the impulse furnished by the sonic switch 500 in response to the ultrasonic beep, the tension spring 512 returns the armature 506 to the original retracted position thereof, but the spring contacts 522 and 523 act as detents to maintain the rotating element 516 in the contact position, thus leaving the cassette recorder 494 in a recording condition.

When the cassette recorder 494 is again to be turned off, another ultrasonic beep, of the frequency to which the sonic switch 500 is tuned, is provided by the tape 70, resulting in the armature 506 of the solenoid 504 again imparting a rotation of a quarter turn to the ratchet wheel 508. This causes the rotating element 516 of the sequence switch 518 to rotate another quarter turn, which places the insulating faces of the rotating element in contact with the spring contacts 522 and 523, thereby breaking or opening the circuit to the solenoids 532 and 536. When the solenoids 532 and 536 are de-energized, a tension spring 544 retracts the armature 530 of the solenoid 532, thus releasing the "Record" and "Play" buttons 526 and 527. The compression spring 538 extends the armature 534 of the solenoid 536, thus depressing the "Stop" button 528.

The foregoing descriptions have covered the method by which a specific lesson or program recorded on the tape 70 is selected and played according to the placement of a series of projections 24, 26, 28 and 30, FIG. 27, located on the bottom of the lesson selector element 2, with the control of the visual and recording phases of the program provided by a series of ultrasonic beeps superimposed within the length of the tape 70. Upon completion of the lesson or program, a final ultrasonic signal is superimposed on the tape 70. The final ultrasonic signal has a frequency different from the afore mentioned two signals, and is sensed by a sonic switch 546, whch is tuned to the frequency of said final signal. The sonic switch 546 is connected to the conductors 491 and 268.

A circuit 548 connects the sonic switch 546 to the winding of a solenoid 550, FIG. 32. When the sonic switch 546 receives the first ultrasonic signal, it energizes the winding of the solenoid 550, causing an armature 552 to move to the right, as shown in FIGS. 2 and 32. This results in a counterclockwise rotation of a bell crank 554, the translation of link 556, and the counterclockwise rotation of the crank 10 to move linkage 12 longitudinally to rotate bell crank 14 attached thereto in clockwise direction to urge the bifurcated arm 18 downward to depress shaft 20 against the tension of spring 22. The counterclockwise rotation of the crank 10 is then transmitted through the shaft 8 to linkage 12, to cause the levers 14 and 18 to pivot to lift latch 4, thereby releasing the lesson selector element 2.

The linkage system, which comprises the members 12, 14, 16 and 18 also cause the shaft 20 to be withdrawn from the disc 400 of the lesson selector element 2, so that the lesson selector element passes over the top of said shaft 20. As seen in the respective FIGS. 11, 8, 7 and 4, springs 558, 560, 562 and 564, which are connected to the respective carriages 40, 42, 46 and 48, return the carriages to an inoperative position of rest against a horizontally disposed bar 566. The movement of the carriages causes the ejection of the lesson selector element 2 from the machine.

The lesson selector element 2 may also be ejected at any time by depressing a "Reject" button 568, FIGS. 2 and 32, which is mechanically in series with the armature 552 of the solenoid 550. Depressing the "Reject" button 568 has the same effect on the above described mechanical linkage as energizing the coil of the solenoid 550 by the sonic switch 546.

The lesson selector element 2 opens the power switch 50, FIGS. 8, 22, 23 and 32, thus de-energizing all electrical circuits in the teaching machine. WHen the circuits are de-energized, the relay 348 releases the switch 356, thus permitting the switch 356 to assume the position shown in FIG. 30, in readiness to resume the selection cycle when the next lesson selector element is inserted into the machine. Immediately upon being released by the shaft 20, the picture disc 400 is returned to the initial position by the spring 418, FIGS. 27 and 28, and the shaft 20 is returned to the initial position by the cord 467B and the spring 467D, FIGS. 2, 18 and 32, which operate in conjunction with the disengagement of the teeth of the armature 468 and the pawl 474 from the teeth of the ratchet wheel 466, FIGS. 8, 19 and 32, caused by the action of the spring 487B depressing or extending the armature 487C of the solenoid 487D against the lugs or extensions 487 and 487A of the solenoid 470 and the pawl 474, respectively. The opening of the power switch 50 also effectively assures that the cassette recorder is turned off by de-energizing the solenoids 532 and 536, FIG. 32, thus releasing the "Record" and "Play" buttons 526 and 527 by depressing the "Stop" button 528.

There is no physical connection between the operation of the tape 70 and the circuits controlled by the sonic switches. The circuits controlled by the sonic switches are dependent upon a series of ultrasonic beeps being received in the proper sequence. It is therefore conceivable that these circuits could become dephased with respect to the program on the tape 70, due to a number of causes. If there is reason to suspect that such dephasing has occurred, the correct phase relationship may be restored by depressing the "Reject" button 568. This releases the lesson selector element 2 and cuts off the power by opening the power switch 50. The visual system immediately becomes rephased by the action of the various springs, as described above.

For rephasing the cassette recorder controls, however, it is required that the rotating element 516 be in the "no contact" position, as shown in FIG. 32. This is accomplished by means of the solenoid 570 which operates in conjunction with the "Butterfly" wheel 514. The winding of the solenoid 570 is connected to the conductor 491, with the circuit being completed by the connection with the common ground 268. The winding of the solenoid 570 is energized during normal operation of the teaching machine, causing the armature 572 to be in the retracted position, as shown in full lines in FIG. 32. With the armature in this position, the butterfly wheel 514 is free to rotate with the shaft 520, the ratchet wheel 508 and the rotating element 516 of the sequence switch 518.

It is further seen, by referring to FIG. 32, that vanes 574 of the "Butterfly" wheel 514 are indexed with the shaft 520 to maintain a parallel relationship with the rivet 517 in the rotating element 516. When the conductor 491 is de-energized by opening the switch 50, FIGS. 31 and 32, or by an interruption of power, the winding of the solenoid 570 also becomes de-energized, thus permitting the compression spring 576 to drive the armature to the extended position shown by the dashed outline FIGS. 9, 15 and 32. When the rotating element 516 is in the "no contact" position, shown in FIG. 32, and the vanes 574 of the "Butterfly" wheel 514 are disposed horizontally, as shown, the armature 572 passes over the vanes 574 without making contact.

If the rotating element 516 is in the "contact" position, with the rivet 517 in contact with the spring contacts 522 and 523, the vanes 574 of the "Butterfly" wheel 514 are vertically disposed, as indicated by the dashed outline in FIG. 32. The armsture 272, when extended by the action of the compression spring 576, contacts one of the vanes 574, thereby causing the "Butterfly" wheel 514 to rotate to the "no contact" position of the rotating element 516.

The sonic switch 546, FIG. 32, since it functions only once, at the conclusion of the program, does not involve a phase relationship with the tape 70, and may therefore be disregarded in this respect.

While reference has been made throughout the specification to the ultrasonic signals or beeps operating sonic switches, it is to be understood that the sound could be sonic to operate the sonic switches or the switches could be ultrasonic switches to be operated by ultrasonic signals or beeps.

What is claimed is:
1. A teaching machine, which machine comprises;
   a. a cabinet,
      1. said cabinet having an opening formed therein to receive a rectangular lesson selector element,
      2. a visual reproduction means within said cabinet,
   b. a rectangular lesson selector element having abutments formed thereon,
      1. a circumferentially apertured disc rotatably mounted on said rectangular lesson selector element and having photographic transparencies in said apertures to sequentially register with said visual reproduction means when said lesson selector element is inserted into the teaching machine to project visual information from said photographic transparencies,
   c. reproduction means within said cabinet having a plurality of lessons recorded thereon for audible reproduction,
      1. sound reproduction means within said cabinet for audibly reproducing a selected lesson of said reproduction means in synchronous relation with respect to said visual reproduction means,
   d. an electrical circuit connected with said teaching machine for activating electrical components therein,
      1. a first sonic switch within said electrical circuit to control the sequential operation of the visual reproduction means, in coordination with said sound reproduction means,
      2. a second sonic switch within said electrical circuit to control the operation of an audio recorder within said electrical circuit and to close said circuit upon the cessation of the recording by an ultrasonic sound being coded onto the tape,
   e. ultrasonic signals coded onto the reproduction means at selected places to initiate action of said first and second sonic switches to open and close circuits and to deactivate the electrical circuit when the recording has been completed.
2. A teaching machine as defined in claim 1, wherein
   a. said cabinet has a plurality of walls,
      1. a translucent screen within a wall thereof for projection of a visual portion of a lesson by said visual reproduction means,
      2. a speaker in a wall of said cabinet for reproduction of the audible portion of a lesson by the audible reproduction means,
      3. a wall of said cabinet having an opening formed therein for admitting said rectangular lesson selector element having abutments thereon to close at least one said switch and to bring the initial aperture containing a transparency into register with the visual reproduction means, to enable a selected disc to project a visual portion of the lesson onto the screen in synchronized sequence with the audible reproduction means,
      4. a further abutment on said rectangular lesson selector element to close a switch to initiate movement of the audible reproduction means in one direction or in the opposite direction to bring the audible reproduction means into proper synchronization with the visual reproduction means.

3. A teaching machine, which machine comprises;
   a. a reproduction means having information recorded thereon for audible reproduction, and sound reproducing means for audible reproduction of a selected part of the information recorded thereon,
   b. visual reproduction means for projecting visual information from photographic transparencies,
   c. control means for controlling the operation of the audible reproduction means and the visual reproduction means to selectively reproduce audible information in synchronization,
      1. said control means comprising electrical circuit means having electrical circuit components for selectively controlling the operation of the audible reproduction means and the visual reproduction means,
      2. a lesson selector element to actuate the electrical control circuit means to operate the audible and visual reproduction means to reproduce selected parts of the audible information and selected visual information,
      3. circuit operating elements on said lesson selector element for actuating circuit components,
   d. said lesson selector element comprising upper, lowr and intermediate sheets of rigid material,
      1. at least one intermediate sheet having a hollow formed therein which is enclosed by said upper and lower sheets,
      2. a disc rotatably mounted in the hollow of said intermediate sheet and having a plurality of openings formed therethrough,
      3. a photographic transparency mounted in selected openings of said disc,
   e. said sheets which enclose said disc having openings formed therein which are in aligned relation and adapted to register with openings in said disc, when each of said openings in said disc is moved to a selected position, to enable the projection of visual information of said transparencies by the visual reproduction means.

4. A teaching machine as defined in claim 3; wherein
   a. said lesson selector element has a notch formed in one edge thereof to actuate one of the electrical circuit components of the circuit control means, and
   b. the lower sheet of rigid material of the lesson selector element has circuit operating projections extending therefrom to actuate other of the circuit components.

5. A teaching machine as defined in claim 4, wherein
   a. said lesson selector element has access means provided therein for entry into the hollow thereof, to enable replacement of the disc containing the transparencies for visual reproduction.

6. A teaching machine as defined in claim 4; wherein
   a. the circuit operating projections extending from the lower sheet of rigid material of said lesson selector element are differently positioned on other lesson selector elements to control the opration operation selected circuit components to different extents to selectively control the operation of the audible reproduction means.

7. A teaching machine as defined in claim 3; wherein
   a. the disc of said lesson selector element has a hub, which hub has a non-circular bore formed therein,
   b. the visual reproduction means includes a drive shaft, which drive shaft is of the same cross-sectional configuration as the bore of the hub of the disc of the lesson selector element,
   c. said upper and lower sheets, of rigid material of said lesson selector element, each has an aperture formed therethrough,
      which apertures are in alignment so as to journal the hub of the disc therein,
      1. said drive shaft and the bore of said hub are adapted to register in complementary relation, when said lesson selector element is positioned within said teaching machine,
   d. the drive shaft of the visual reproduction means extends through the bore of the hub of the lesson selector element to selectively rotate the disc when the lesson selector element is positioned in operative proximity to a selected circuit component.

8. A preprogrammed teaching machine, which machine comprises;
   a. a housing,
   b. sound reproduction means within said housing,
   c. a visual reproduction means within said housing,
   d. a translucent screen mounted in said housing to receive visual reproductions,
   e. a plurality of guideways within said housing,
   f. a slot formed within a wall of said housing to be in register with one of said guideways to receive a lesson selector element therein,
   g. a rectangular lesson selector element, having abutments formed thereon, which element is adapted to be inserted through said slot in said housing into one of said guideways,
   h. photographic transparencies mounted within said lesson selector element and being adapted to register with said visual reproduction means, when in one position,
   i. means for succesively moving said photographic transparencies into and out of register with said visual reproduction means sequentially,
   j. electrical circuits associated with said teaching machine,
      1. a starting switch element within said electrical circuit,
      2. a forward switch element within said electrical circuit,
      3. a reverse switch element within said electrical circuit,
      4. sonic switch elements within said electrical circuit,
   k. said lesson selector element having abutments formed thereon to actuate said starting switch element and to close said forward switch element or to close said reverse switch element to selectively start the sequential projection of said transparencies onto said translucent screen and further to start said sound reproduction means in synchronized relation with said transparencies, and to progressively move said transparencies out of register with said visual reproduction means and to sequentially move other transparencies into register therewith to present a preprogrammed lesson as determined by one of said switching elements,
      1. one of said sonic switch elements being adapted to close said electrical circuit to start said sound reproduction means,
   1. sound recording means associated with said housing so that a person taking the lesson will be allotted a selected interval of time in which to record comments and answers on a sound track, and m. one of said sonic switch elements within said teaching machine being responsive to a sonic signal on the sound track to stop the recording means and to eject the rectangular lesson selector element from the slot of the teaching machine and to deactivate the teaching machine.

9. A teaching machine as defined in claim 8; wherein
a. a carriage is movably mounted on another of said guideways, which carriage has contact switch points thereon to selectively form a circuit,
b. means on said lesson selector element engageable with said carriage to move said carriage along said guideway to a predetermined position,
c. a gear element connected in driven relation with said sound reproduction means,
d. an idler gear positioned a spaced distance from said gear element,
e. an endless member surrounding said gear element and said idler gear in driving relation, and
f. spaced apart cam abutments on said endless member to engage said switch on said carriage to close said contact switch points when one of said cam abutments on said endless member engages said switch to bring the proper preprogrammed lesson into position to reproduce sound in synchronized relation with said photographic transparencies transmitted onto said translucent screen.

10. A teaching machine as defined in claim 9; wherein
a. a second carriage is mounted in another of said guideways,
b. a second gear element is connected in driven relation with said sound reproduction means,
c. a second idler gear is positioned a spaced distance from said second gear element,
d. a second endless member surrounds said second gear element and said second idler gear in driving relation,
e. spaced apart abutment cams on said second endless member,
  1. said second carriage has a downwardly extending arm thereon,
  2. a contact point on said arm,
  3. a contact point on said second carriage so upon said downwardly extending arm engaging said abutments a circuit is closed through said points to cause said sound reproduction means to initiate movement of said first and second endless members until a preprogrammed lesson is moved into proper position for reproduction of a portion of a sound track and to project photographic transparencies onto said translucent screen.

11. A teaching machine as defined in claim 10; wherein
a. a third carriage is mounted in one of said guideways,
b. a plurality of switches mounted on said third carriage,
c. a third gear element is rotatably mounted within said housing and is connected in driven relation with said sound reproducing means,
d. an idler gear is rotatably mounted a spaced distance from said third gear element,
e. a third endless drive member surrounding said third gear element and said third idler gear in driving relation,
f. abutment cams on said third endless member,
  1. projections extending downward from said third carriage are engageable with said abutment cams when in a selected position,
  2. said abutment cams are adapted to engage said switches on said third carriage when in one postiion to close said switches,
  3. said switches each having contact point on each said downwardly extending projection and contact points on said third carriage, so upon said projections engaging said abutment cams said contact points will be closed to form a circuit through said switches to cause power means, which operate said sound reproduction means, to drive said sound reproduction means one way or another so as to bring said lesson into a reproduction position.

12. A preprogrammed teaching machine as defined in claim 8, wherein
a. said lesson selector element has projections thereon to selectively actuate a forward or reverse switch element to bring said sound reproduction means and said visual reproduction means into synchronized relation to reproduce a preprogrammed lesson.

13. A preprogrammed teaching machine as defined in claim 12; wherein
a. said projections on said lesson selector element are selectively positioned to cause different programs to be brought into position for the reproduction thereof, when each of the lesson selector elements is fully inserted into said guideway.

14. A preprogrammed teaching machine as defined in claim 12; wherein
a. an abutment of each said lesson selector element,
b. latch means within said teaching machine housing which is engageable with said abutment when said lesson selector element is properly inserted in said guideways so said lesson selector element is held in a selected position until the lesson has been reproduced, and
c. means for releasing said latch means to enable another lesson selector element to be moved into said guideways.

* * * * *